United States Patent
Pettersson et al.

(10) Patent No.: US 12,200,226 B2
(45) Date of Patent: Jan. 14, 2025

(54) PICTURE HEADER PREDICTION

(71) Applicant: Telefonaktiebolaget LM Ericsson (publ), Stockholm (SE)

(72) Inventors: Martin Pettersson, Vallentuna (SE); Rickard Sjöberg, Stockholm (SE); Mitra Damghanian, Upplands-Bro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 262 days.

(21) Appl. No.: 17/787,307

(22) PCT Filed: Dec. 4, 2020

(86) PCT No.: PCT/EP2020/084756
§ 371 (c)(1),
(2) Date: Jun. 18, 2022

(87) PCT Pub. No.: WO2021/122070
PCT Pub. Date: Jun. 24, 2021

(65) Prior Publication Data
US 2023/0076537 A1 Mar. 9, 2023

Related U.S. Application Data

(60) Provisional application No. 62/950,186, filed on Dec. 19, 2019.

(51) Int. Cl.
*H04N 19/174* (2014.01)
*H04N 19/172* (2014.01)
*H04N 19/184* (2014.01)

(52) U.S. Cl.
CPC ......... *H04N 19/174* (2014.11); *H04N 19/172* (2014.11); *H04N 19/184* (2014.11)

(58) Field of Classification Search
CPC ... H04N 19/174; H04N 19/172; H04N 19/184
See application file for complete search history.

(56) References Cited

U.S. PATENT DOCUMENTS 9,560,367 B2 * 1/2017 Wang ............... H04N 19/61
2009/0316793 A1 * 12/2009 Yang ............... H04N 19/61
375/240.24

(Continued)

FOREIGN PATENT DOCUMENTS

WO    WO 2018/122092 A1    7/2018

OTHER PUBLICATIONS

International Search Report and Written Opinion of the International Searching Authority, PCT/EP2020/084756, mailed Feb. 12, 2021, 17 pages.

(Continued)

*Primary Examiner* — Fabio S Lima
(74) *Attorney, Agent, or Firm* — Sage Patent Group

(57) ABSTRACT

A method for decoding a plurality of pictures from a bitstream is provided where the bitstream includes a first segment header and a second segment header. The method includes decoding a first picture from the bitstream using first parameter values decoded from the first segment header. The method includes decoding a second picture from the bitstream using second parameter values from the second segment header, wherein at least one second parameter value of the second parameter values from the second segment header is derived from a first parameter value of the first parameter values decoded from the first segment header.

21 Claims, 7 Drawing Sheets

(56) References Cited

U.S. PATENT DOCUMENTS

| | | | | |
|---|---|---|---|---|
| 2010/0061445 | A1* | 3/2010 | Shimada | G11B 27/034 375/E7.126 |
| 2011/0176600 | A1* | 7/2011 | Wang | H04N 19/172 375/240.01 |
| 2012/0106624 | A1* | 5/2012 | Huang | H04N 19/86 375/E7.126 |
| 2012/0207227 | A1* | 8/2012 | Tsai | H04N 19/172 375/E7.194 |
| 2012/0251015 | A1* | 10/2012 | Lim | H04N 19/172 382/233 |
| 2013/0016788 | A1* | 1/2013 | Oh | H04N 19/18 375/E7.123 |
| 2013/0114701 | A1* | 5/2013 | Lim | H04N 19/61 375/240.03 |
| 2013/0142257 | A1* | 6/2013 | Wang | H04N 19/172 375/240.12 |
| 2019/0306502 | A1* | 10/2019 | Gadde | H04N 19/117 |
| 2019/0373258 | A1* | 12/2019 | Karczewicz | H04N 19/154 |
| 2021/0152826 | A1* | 5/2021 | Chen | H04N 19/70 |
| 2022/0132140 | A1* | 4/2022 | Yu | H04N 19/172 |

OTHER PUBLICATIONS

Chen, Y., et al., AHG9: Header Parameter Set (HPS), Joint Collaborative Team on Video Coding (JCT-VC) of ITU-T SG16 WP3 and ISO/IEC JTC1/SC29/WG11, 10$^{th}$ Meeting: Stockholm, SE, Jul. 11-20, 2012, JCTVC-J0109 (XP030112471) 12 pages.

Hannuksela, M., "3DV-HTM High-Level Syntax: Slice Header Prediction," ISO/IEC JTC1/SC29/WG11 MPEG2012/M24894, May 2012, Geneva, Switzerland, Nokia Corporation (XP030053237) 7 pages.

* cited by examiner

DECODING A FIRST SLICE OF THE SECOND PICTURE FROM THE BITSTREAM, WHEREIN THE FIRST SLICE COMPRISES A FIRST SLICE HEADER AND DECODING THE FIRST SLICE COMPRISES USING AT LEAST ONE VALUE DECODED FROM THE FIRST SLICE HEADER AND THE AT LEAST ONE SECOND PARAMETER VALUE
701

DECODING A SECOND SLICE OF THE SECOND PICTURE FROM THE BITSTREAM, WHEREIN THE SECOND SLICE COMPRISES A SECOND SLICE HEADER AND DECODING THE SECOND SLICE COMPRISES USING AT LEAST ONE VALUE DECODED FROM THE SECOND SLICE HEADER AND THE AT LEAST ONE SECOND PARAMETER VALUE
703

Figure 7

ENCODING A FIRST SLICE OF THE SECOND PICTURE INTO THE BITSTREAM, WHEREIN THE FIRST SLICE COMPRISES A FIRST SLICE HEADER AND ENCODING THE FIRST SLICE COMPRISES USING AT LEAST ONE VALUE FROM THE FIRST SLICE HEADER AND THE AT LEAST ONE SECOND PARAMETER VALUE
901

ENCODING A SECOND SLICE OF THE SECOND PICTURE INTO THE BITSTREAM, WHEREIN THE SECOND SLICE COMPRISES A SECOND SLICE HEADER AND ENCODING THE SECOND SLICE COMPRISES USING AT LEAST ONE VALUE FROM THE SECOND SLICE HEADER AND THE AT LEAST ONE SECOND PARAMETER VALUE
903

Figure 9

PICTURE HEADER PREDICTION

CROSS REFERENCE TO RELATED APPLICATIONS

This application is a 35 U.S.C. § 371 national stage application of PCT International Application No. PCT/EP2020/084756 filed on Dec. 4, 2020, which in turn claims domestic priority to U.S. Provisional Patent Application No. 62/950,186, filed on Dec. 19, 2019, the disclosures and content of which are incorporated by reference herein in their entireties.

TECHNICAL FIELD

The present disclosure relates generally to methods and apparatuses for video encoding and decoding.

BACKGROUND

High Efficiency Video Coding (HEVC) is a block-based video codec standardized by ITU-T (International Telecommunication Union Telecommunication Standardization Sector) and MPEG (Moving Pictures Expert Group) that utilizes both temporal and spatial prediction. Spatial prediction is achieved using intra (I) prediction from within the current picture. Temporal prediction is achieved using uni-directional (P) or bi-directional (B) inter prediction on block level from previously decoded reference pictures. In the encoder, the difference between the original pixel data and the predicted pixel data, referred to as the residual, is transformed into the frequency domain, quantized and then entropy coded before transmitted together with necessary prediction parameters such as prediction mode and motion vectors, also entropy coded. The decoder performs entropy decoding, inverse quantization and inverse transformation to obtain the residual, and then adds the residual to an intra or inter prediction to reconstruct a picture.

MPEG and ITU-T are working on the successor to HEVC within the Joint Video Exploratory Team (JVET). The name of this video codec under development is Versatile Video Coding (VVC). The current version of the VVC specification is JVET-P2001-vE.

Components

A video sequence consists of a series of images where each image consists of one or more components. Each component can be described as a two-dimensional rectangular array of sample values. An image in a video sequence typically consists of three components; one luma component Y where the sample values are luma values and two chroma components Cb and Cr, where the sample values are chroma values. The dimensions of the chroma components are often smaller than the luma components by a factor of two in each dimension. For example, the size of the luma component of an HD image would be 1920×1080 and the chroma components would each have the dimension of 960×540. Components are sometimes referred to as color components.

Blocks and Units

A block is one two-dimensional array of samples. In video coding, each component is split into blocks and the coded video bitstream consists of a series of coded blocks. It is common in video coding that the image is split into units that cover a specific area of the image. Each unit consists of all blocks from all components that make up that specific area and each block belongs fully to one unit. The macroblock in H.264 and the Coding unit (CU) in HEVC are examples of units.

A block can alternatively be defined as a two-dimensional array in which a transform used in coding is applied to the two-dimensional array. These blocks are called "transform blocks." Alternatively, a block can be defined as a two-dimensional array in which a single prediction mode is applied to two-dimensional array. These blocks can be called "prediction blocks". In the description herein, the word "block" is not tied to either of these definitions but that the descriptions herein can apply to either definition.

NAL Units

Both HEVC and VVC define a Network Abstraction Layer (NAL). All the data, i.e. both Video Coding Layer (VCL) or non-VCL data in HEVC and VVC is encapsulated in NAL units. A VCL NAL unit contains data that represents picture sample values. A non-VCL NAL unit contains additional associated data such as parameter sets and supplemental enhancement information (SEI) messages. The NAL unit in HEVC and the current version of VVC begins with a header called the NAL unit header. The syntax for the NAL unit header for HEVC is shown in Table 1 and starts with a forbidden_zero_bit that shall always be equal to 0 to prevent start code emulations. Without it, some MPEG systems might confuse the HEVC video bitstream with other data, but the 0 bit in the NAL unit header makes all possible HEVC bitstreams uniquely identifiable as HEVC bitstreams. The nal_unit_type, nuh_layer_id and nuh_temporal_id_plus1 code words specify the NAL unit type of the NAL unit that identifies what type of data is carried in the NAL unit, the layer ID and the temporal ID for which the NAL unit belongs to. The NAL unit type indicates and specifies how the NAL unit should be parsed and decoded. The NAL unit header in the current version of VVC, shown in Table 2 is very similar to the one in HEVC, but uses 1 bit less for the nal_unit_type and instead reserves this bit for future use.

The rest of the bytes of the NAL unit is payload of the type indicated by the NAL unit type. A bitstream consists of a series of concatenated NAL units.

TABLE 1

HEVC NAL unit header syntax

| | Descriptor |
|---|---|
| nal_unit_header( ) { | |
|     forbidden_zero_bit | f(1) |
|     nal_unit_type | u(6) |
|     nuh_layer_id | u(6) |
|     nuh_temporal_id_plus1 | u(3) |
| } | |

TABLE 2

NAL unit header syntax of the current version of VVC

| | Descriptor |
|---|---|
| nal_unit_header( ) { | |
|     forbidden_zero_bit | f(1) |
|     nuh_reserved_zero_bit | u(1) |
|     nuh_layer_id | u(6) |
|     nal_unit_type | u(5) |
|     nuh_temporal_id_plus1 | u(3) |
| } | |

A decoder or bitstream parser can conclude how the NAL unit should be handled, e.g. parsed and decoded, based on the NAL unit header. The rest of the bytes of the NAL unit is payload of the type indicated by the NAL unit type. A bitstream consists of a series of concatenated NAL units.

The NAL unit type indicates and defines how the NAL unit should be parsed and decoded. A VCL NAL unit provides information about the picture type of the current picture. The NAL unit types of the current version of the VVC draft are shown in Table 2.

The decoding order is the order in which NAL units should be decoded, which is the same as the order of the NAL units within the bitstream. The decoding order may be different from the output order, which is the order in which decoded pictures are to be output, such as for display, by the decoder.

Temporal Layers

In HEVC and in the current version of VVC, all pictures are associated with a TemporalId value which specified what temporal layer the picture belongs to. TemporalId values are decoded from the nuh_temporal_id_plus1 syntax element in the NAL unit header. In HEVC, the encoder is required to set TemporalId values such that pictures belonging to a lower layer is perfectly decodable when higher temporal layers are discarded. Assume for instance that an encoder has output a bitstream using temporal layers 0, 1 and 2. Then removing all layer 2 NAL units or removing all layer 1 and 2 NAL units will result in bitstreams that can be decoded without problems. This is ensured by restrictions in the HEVC/VVC specification that the encoder must comply with. For instance, it is not allowed for a picture of a temporal layer to reference a picture of a higher temporal layer.

Layers, Dependent and Independent Layers

Layers are defined in VVC as a set of VCL NAL units that all have a particular value of nuh_layer_id and the associated non-VCL NAL units.

A layer access unit in VVC is defined as a set of NAL units for which the VCL NAL units all have a particular value of nuh_layer_id, that are associated with each other according to a specified classification rule, that are consecutive in decoding order, and that contain exactly one coded picture.

A coded layer video sequence (CLVS) in the current version of VVC is defined as a sequence of layer access units that consists, in decoding order, of a CLVS layer access unit, followed by zero or more layer access units that are not CLVS layer access units, including all subsequent layer access units up to but not including any subsequent layer access unit that is a CLVS layer access unit.

The relation between the layer access units and coded layer video sequences is illustrated in FIG. 1.

In the current version of VVC, layers may be coded independently or dependently from each other. When the layers are coded independently, a layer with e.g. nuh_layer_id 0 may not predict video data from another layer with e.g. nuh_layer_id 1. In the current version of VVC, dependent coding between layers may be used, which enables support for scalable coding with SNR, spatial and view scalability.

Picture Order Count (POC)

Pictures in HEVC are identified by their picture order count (POC) values, also known as full POC values. Each slice contains a code word, pic_order_cnt_lsb, that shall be the same for all slices in a picture. pic_order_cnt_lsb is also known as the least significant bits (lsb) of the full POC since it is a fixed-length code word and only the least significant bits of the full POC is signaled. Both encoder and decoder keep track of POC and assign POC values to each picture that is encoded/decoded. The pic_order_cnt_lsb can be signaled by 4-16 bits. There is a variable MaxPicOrderCntLsb used in HEVC which is set to the maximum pic_order_cnt_lsb value plus 1. This means that if 8 bits are used to signal pic_order_cnt_lsb, the maximum value is 255 and MaxPicOrderCntLsb is set to 2^8=256. The picture order count value of a picture is called PicOrderCntVal in HEVC. Usually, PicOrderCntVal for the current picture is simply called PicOrderCntVal. POC is expected to work in a similar way in the final version of VVC.

Access Units and the Access Unit Delimiter

For single layer coding in HEVC and the current VVC draft, an access unit (AU) is the coded representation of a single picture. An AU may consist of several video coding layer (VCL) NAL units as well as non-VCL NAL units. An access unit, in the current version of VVC, must start with an access unit delimiter (AUD) NAL unit which indicates the start of the access unit and the type of the slices allowed in the picture, i.e. I, I-P or I-P-B. In HEVC, it is optional for an AU to start with an AUD. The syntax and semantics for the access unit delimiter NAL unit in the current version of the VVC draft is shown below.

TABLE 3

Access unit delimiter RBSP syntax in the current version of the VVC draft

| Descriptor |
| --- |
| access_unit_delimiter_rbsp( ) { |
|   pic_type                               u(3) |
|   rbsp_trailing_bits( ) |
| } |

Access Unit Delimiter RBSP Semantics

The access unit delimiter is used to indicate the start of an access unit and the type of slices present in the coded pictures in the access unit containing the access unit delimiter NAL unit. There is no normative decoding process associated with the access unit delimiter.

pic_type indicates that the slice_type values for all slices of the coded pictures in the access unit containing the access unit delimiter NAL unit are members of the set listed in Table 7-3 for the given value of pic_type. The value of pic_type shall be equal to 0, 1 or 2 in bitstreams conforming to this version of this Specification. Other values of pic_type are reserved for future use by ITU T|ISO/IEC. Decoders conforming to this version of this Specification shall ignore reserved values of pic_type.

TABLE 7-3

Interpretation of pic_type

| pic_type | slice_type values that may be present in the coded picture |
| --- | --- |
| 0 | I |
| 1 | P, I |
| 2 | B, P, I |

Intra Random Access Point (IRAP) Pictures and the Coded Video Sequence (CVS)

An intra random access point (IRAP) picture in HEVC is a picture that does not refer to any pictures other than itself for prediction in its decoding process. The first picture in the bitstream in decoding order in HEVC must be an TRAP picture but an IRAP picture may additionally also appear later in the bitstream. HEVC specifies three types of IRAP pictures. The three types of IRAP pictures are the broken link access (BLA) picture, the instantaneous decoder refresh (IDR) picture and the clean random access (CRA) picture.

A coded video sequence (CVS) in HEVC is a series of access units starting at an IRAP access unit up to, but not including the next IRAP access unit in decoding order.

IDR pictures always start a new CVS. An IDR picture may have associated random access decodable leading (RADL) pictures. An IDR picture does not have associated random access skipped leading (RASL) pictures.

A BLA picture in HEVC also starts a new CVS and has the same effect on the decoding process as an IDR picture. However, a BLA picture in HEVC may contain syntax elements that specify a non-empty set of reference pictures. A BLA picture may have associated RASL pictures, which are not output by the decoder and may not be decodable, as they may contain references to pictures that may not be present in the bitstream. A BLA picture may also have associated RADL pictures, which are decoded. BLA pictures are not defined in the current version of VVC.

A CRA picture may have associated RADL or RASL pictures. As with a BLA picture, a CRA picture may contain syntax elements that specify a non-empty set of reference pictures. For CRA pictures, a flag can be set to specify that the associated RASL pictures are not output by the decoder, because they may not be decodable, as they may contain references to pictures that are not present in the bitstream. A CRA may start a CVS.

In the current version of the VVC draft, a CVS is started at a CVS start (CVSS) access unit, which may contain an IRAP picture, i.e, an IDR or a CRA picture, or a gradual decoding refresh (GDR) picture.

GDR pictures are essentially used for random access in bitstreams encoded for low-delay coding where a full IRAP picture would cause too much delay. A GDR picture may use gradual intra refresh that updates the video picture by picture where each picture is only partially intra coded. It is signaled with the GDR picture when the video is fully refreshed and ready for output, given that the bitstream was tuned into at the GDR picture. A GDR may start a CVS.

The Step-Wise Temporal Sub-Layer Access (STSA) Picture

In HEVC (and in the current VVC draft), there is a picture type called the step-wise temporal sub-layer access (STSA) picture. There are two types of STSA pictures in HEVC. The two types of STSA pictures are STSA_R, which is an STSA picture that is also a reference picture, and STSA N, which is an STSA picture that is a non-reference picture. In the current VVC draft only one type of STSA picture is specified and no distinction is made whether the STSA picture is a reference or non-reference picture.

The STSA picture is intended to indicate a position in the bitstream where it is possible to switch up from a lower temporal layer to a higher temporal layer. For example, a decoder may decode temporal layer N which means that all NAL units with a TemporalId equal to or lower than N are decoded and all NAL units with a TemporalId higher than N are ignored. If there is an STSA picture having a TemporalId of N+1, the decoder is ensured to be able to decode that STSA picture and all NAL units that follow the STSA picture in decoding order having a TemporalId equal to or lower than N+1.

Slice

The concept of slices in HEVC divides the picture into independently coded slices, where decoding of one slice in a picture is independent of other slices of the same picture. Different coding types could be used for slices of the same picture, i.e. a slice could either be an I-slice, P-slice or B-slice. One purpose of slices is to enable resynchronization in case of data loss. In HEVC, a slice is a set of CTUs.

In the current version of VVC, a picture may be partitioned into either raster scan slices or rectangular slices. A raster scan slice consists of a number of complete tiles in raster scan order. A rectangular slice consists of a group of tiles that together occupy a rectangular region in the picture or a consecutive number of CTU rows inside one tile. Each slice has a slice header comprising syntax elements. Decoded slice header values from these syntax elements are used when decoding the slice. Each slice is carried in one VCL NAL unit.

In a previous version of the VVC draft specification, slices were referred to as tile groups.

Subpictures

The concept of subpictures is supported in the current version of VVC. A subpicture is defined as a rectangular region of one or more slices within a picture. This means a subpicture contains one or more slices that collectively cover a rectangular region of a picture.

Subpictures may be used to more easily perform extraction and merging operations of picture partitions in a video bitstream, such as for viewport dependent 360 video streaming, without having to go through complicated means to verify the independence of the picture partitions.

In the current version of the VVC draft specification, the location and size of the subpictures are signaled in the SPS. Boundaries of a subpicture region may be treated as picture boundaries (excluding in-loop filtering operations) conditioned to a per-subpicture flag subpic_treated_as_pic_flag[i] in the SPS. Also loop-filtering on subpicture boundaries is conditioned to a per-subpicture flag loop_filter_across_subpic_enabled_flag[i] in the SPS.

There is also a subpicture ID mapping mechanism signaled in the SPS for the subpictures which is gated by two flags sps_subpic_id_present_flag and sps_subpic_id_signalling_present_flag.

Reference Picture Lists

In VVC reference picture lists (RPLs) are signaled for a current picture to indicate which previously decoded pictures the decoder should keep for reference for decoding the current and future pictures. There are two RPLs for each picture. For inter-prediction only from one picture (P-prediction) only the first RPL is used and for inter-prediction from two pictures (B-prediction) both the first and the second RPL are used. That an entry is active in a RPL means that the reference picture in the entry is used to decode the current picture. If the reference picture in an entry is not going to be used to predict the current picture but used to predict a later picture, the entry should be kept in the RPL but inactive in the RPL of the current picture.

Parameter Sets

HEVC and VVC specifies three types of parameter sets, the picture parameter set (PPS), the sequence parameter set (SPS) and the video parameter set (VPS). The PPS contains data that is common for a whole picture, the SPS contains data that is common for a coded video sequence (CVS) and the VPS contains data that is common for multiple CVSs, e.g. data for multiple layers in the bitstream.

The current version of VVC also specifies two additional parameter sets, the adaptation parameter set (APS) and the decoder parameter set (DPS).

The APS carries parameters needed for the adaptive loop filter (ALF) tool and the luma mapping and chroma scaling (LMCS) tool.

The DPS specifies information that may not change during the decoding session and may be good for the decoder to know about, e.g. the maximum number of allowed sub-layers. The information in DPS is not necessary for operation of the decoding process.

The decoder parameter set also contains a set of general constraints for the bitstream, that gives the decoder information of what to expect from the bitstream. In the current version of VVC, the general constraint info could also be signaled in VPS.

Picture Header

In the current version of VVC, the VCL NAL units of a coded picture are preceded by a picture header. The picture header contains parameters that are common for all slices of the associated picture. Some of the parameters may be signaled in either the picture header or in the slice header of each slice in the picture conditioned on a presence flag signaled in the picture header. The picture header is signaled in its own NAL unit with NAL unit type PH_NUT. While HEVC does not have picture headers, it is mandatory to have a picture header for every picture in the current version of VVC.

The picture header syntax in the current version of VVC is shown below.

| | Descriptor |
|---|---|
| picture_header_rbsp( ) { | |
|   non_reference_picture_flag | u(1) |
|   gdr_pic_flag | u(1) |
|   no_output_of_prior_pics_flag | u(1) |
|   if( gdr_pic_flag ) | |
|     recovery_poc_cnt | ue(v) |
|   ph_pic_parameter_set_id | ue(v) |
|   if( sps_poc_msb_flag ) { | |
|     ph_poc_msb_present_flag | u(1) |
|     if( ph_poc_msb_present_flag ) | |
|       poc_msb_val | u(v) |
|   } | |
|   if( sps_subpic_id_present_flag && !sps_subpic_id_signalling_flag ) { | |
|     ph_subpic_id_signalling_present_flag | u(1) |
|     if( ph_subpics_id_signalling_present_flag ) { | |
|       ph_subpic_id_len_minus1 | ue(v) |
|       for( i = 0; i <= sps_num_subpics_minus1; i++ ) | |
|         ph_subpic_id[ i ] | u(v) |
|     } | |
|   } | |
|   if( !sps_loop_filter_across_virtual_boundaries_disabled_present_flag ) { | |
|     ph_loop_filter_across_virtual_boundaries_disabled_present_flag | u(1) |
|     if( ph_loop_filter_across_virtual_boundaries_disabled_present_flag ) | |
|   { | |
|     ph_num_ver_virtual_boundaries | u(2) |
|     for( i = 0; i < ph_num_ver_virtual_boundaries; i++ ) | |
|       ph_virtual_boundaries_pos_x[ i ] | u(13) |
|     ph_num_hor_virtual_boundaries | u(2) |
|     for( i = 0; i < ph_num_hor_virtual_boundaries; i++ ) | |
|       ph_virtual_boundaries_pos_y[ i ] | u(13) |
|     } | |
|   } | |
|   if( separate_colour_plane_flag == 1 ) | |
|     colour_plane_id | u(2) |
|   if( output_flag_present_flag ) | |
|     pic_output_flag | u(1) |
|   pic_rpl_present_flag | u(1) |
|   if( pic_rpl_present_flag ) { | |
|     for( i = 0; i < 2; i++ ) { | |
|       if( num_ref_pic_lists_in_sps[ i ] > 0 && !pps_ref_pic_list_sps_idc[ i ] && | |
|         ( i == 0 \|\| ( i == 1 && rpl1_idx_present_flag ) ) ) | |
|         pic_rpl_sps_flag[ i ] | u(1) |
|       if( pic_rpl_sps_flag[ i ] ) { | |
|         if( num_ref_pic_lists_in_sps[ i ] > 1 && | |
|           ( i == 0 \|\| ( i == 1 && rpl1_idx_present_flag ) ) ) | |
|         pic_rpl_idx[ i ] | u(v) |
|       } else | |
|         ref_pic_list_struct( i, num_ref_pic_lists_in_sps[ i ] ) | |
|       for( j = 0; j < NumLtrpEntries[ i ][ RplsIdx[ i ] ]; j++ ) { | |
|         if( ltrp_in_slice_header_flag[ i ][ RplsIdx[ i ] ] ) | |
|           pic_poc_lsb_lt[ i ][ j ] | u(v) |
|         pic_delta_poc_msb_present_flag[ i ][ j ] | u(1) |
|         if( pic_delta_poc_msb_present_flag[ i ][ j ] ) | |
|           pic_delta_poc_msb_cycle_lt[ i ][ j ] | ue(v) |
|       } | |
|     } | |
|   } | |
|   if( partition_constraints_override_enabled_flag ) { | |
|     partition_constraints_override_flag | u(1) |
|     if( partition_constraints_override_flag ) { | |
|       pic_log2_diff_min_qt_min_cb_intra_slice_luma | ue(v) |
|       pic_log2_diff_min_qt_min_cb_inter_slice | ue(v) |
|       pic_max_mtt_hierarchy_depth_inter_slice | ue(v) |

| Descriptor |
|---|

| | |
|---|---|
| pic_max_mtt_hierarchy_depth_intra_slice_luma | ue(v) |
| if( pic_max_mtt_hierarchy_depth_intra_slice_luma != 0 ) { | |
|   pic_log2_diff_max_bt_min_qt_intra_slice_luma | ue(v) |
|   pic_log2_diff_max_tt_min_qt_intra_slice_luma | ue(v) |
| } | |
| if( pic_max_mtt_hierarchy_depth_inter_slice != 0 ) { | |
|   pic_log2_diff_max_bt_min_qt_inter_slice | ue(v) |
|   pic_log2_diff_max_tt_min_qt_inter_slice | ue(v) |
| } | |
| if( qtbtt_dual_tree_intra_flag ) { | |
|   pic_log2_diff_min_qt_min_cb_intra_slice_chroma | ue(v) |
|   pic_max_mtt_hierarchy_depth_intra_slice_chroma | ue(v) |
|   if( pic_max_mtt_hierarchy_depth_intra_slice_chroma != 0 ) { | |
|     pic_log2_diff_max_bt_min_qt_intra_slice_chroma | ue(v) |
|     pic_log2_diff_max_tt_min_qt_intra_slice_chroma | ue(v) |
|   } | |
| } | |
| } | |
| } | |
| if( cu_qp_delta_enabled_flag ) { | |
|   pic_cu_qp_delta_subdiv_intra_slice | ue(v) |
|   pic_cu_qp_delta_subdiv_inter_slice | ue(v) |
| } | |
| if( pps_cu_chroma_qp_offset_list_enabled_flag ) { | |
|   pic_cu_chroma_qp_offset_subdiv_intra_slice | ue(v) |
|   pic_cu_chroma_qp_offset_subdiv_inter_slice | ue(v) |
| } | |
| if( sps_temporal_mvp_enabled_flag ) | |
|   pic_temporal_mvp_enabled_flag | u(1) |
| if(!pps_mvd_l1_zero_idc ) | |
|   mvd_l1_zero_flag | u(1) |
| if( !pps_six_minus_max_num_merge_cand_plus1 ) | |
|   pic_six_minus_max_num_merge_cand | ue(v) |
| if( sps_affine_enabled_flag ) | |
|   pic_five_minus_max_num_subblock_merge_cand | ue(v) |
| if( sps_fpel_mmvd_enabled_flag ) | |
|   pic_fpel_mmvd_enabled_flag | u(1) |
| if( sps_bdof_pic_present_flag ) | |
|   pic_disable_bdof_flag | u(1) |
| if( sps_dmvr_pic_present_flag ) | |
|   pic_disable_dmvr_flag | u(1) |
| if( sps_prof_pic_present_flag ) | |
|   pic_disable_prof_flag | u(1) |
| if( sps_triangle_enabled_flag && MaxNumMergeCand >= 2 && | |
| !pps_max_num_merge_cand_minus_max_num_triangle_cand_plus1 ) | |
|   pic_max_num_merge_cand_minus_max_num_triangle_cand | ue(v) |
| if ( sps_ibc_enabled_flag ) | |
|   pic_six_minus_max_num_ibc_merge_cand | ue(v) |
| if( sps_joint_cbcr_enabled_flag ) | |
|   pic_joint_cbcr_sign_flag | u(1) |
| if( sps_sao_enabled_flag ) { | |
|   pic_sao_enabled_present_flag | u(1) |
|   if( pic_sao_enabled_present_flag ) { | |
|     pic_sao_luma_enabled_flag | u(1) |
|     if(ChromaArrayType != 0 ) | |
|       pic_sao_chroma_enabled_flag | u(1) |
|   } | |
| } | |
| if( sps_alf_enabled_flag ) { | |
|   pic_alf_enabled_present_flag | u(1) |
|   if( pic_alf_enabled_present_flag ) { | |
|     pic_alf_enabled_flag | u(1) |
|     if( pic_alf_enabled_flag ) { | |
|       pic_num_alf_aps_ids_luma | u(3) |
|       for( i = 0; i < pic_num_alf_aps_ids_luma; i++ ) | |
|         pic_alf_aps_id_luma[ i ] | u(3) |
|       if( ChromaArrayType != 0 ) | |
|         pic_alf_chroma_idc | u(2) |
|       if( pic_alf_chroma_idc ) | |
|         pic_alf_aps_id_chroma | u(3) |
|     } | |
|   } | |
| } | |
| if ( !pps_dep_quant_enabled_flag ) | |
|   pic_dep_quant_enabled_flag | u(1) |
| if( !pic_dep_quant_enabled_flag ) | |
|   sign_data_hiding_enabled_flag | u(1) |

-continued

| Descriptor |
|---|
| if( deblocking_filter_override_enabled_flag ) { |
|   pic_deblocking_filter_override_present_flag    u(1) |
|   if( pic_deblocking_filter_override_present_flag ) { |
|     pic_deblocking_filter_override_flag    u(1) |
|     if( pic_deblocking_filter_override_flag ) { |
|       pic_deblocking_filter_disabled_flag    u(1) |
|       if( !pic_deblocking_filter_disabled_flag ) { |
|         pic_beta_offset_div2    se(v) |
|         pic_tc_offset_div2    se(v) |
|       } |
|     } |
|   } |
| } |
| if( sps_lmcs_enabled_flag ) { |
|   pic_lmcs_enabled_flag    u(1) |
|   if( pic_lmcs_enabled_flag ) { |
|     pic_lmcs_aps_id    u(2) |
|     if( ChromaArrayType != 0 ) |
|       pic_chroma_residual_scale_flag    u(1) |
|   } |
| } |
| if( sps_scaling_list_enabled_flag ) { |
|   pic_scaling_list_present_flag    u(1) |
|   if( pic_scaling_list_present_flag ) |
|     pic_scaling_list_aps_id    u(3) |
| } |
| if( picture_header_extension_present_flag ) { |
|   ph_extension_length    ue(v) |
|   for( i = 0; i < ph_extension_length; i++) |
|     ph_extension_data_byte[ i ]    u(8) |
| } |
| rbsp_trailing_bits( ) |
| } |

AV1 Frame Header Copy

The AV1 Bitstream & Decoding Process Specification (2019-01-30) specifies a frame header that comprises elements that are identical for all tile groups in a picture. The specification includes a frame_header_copy( ) function that is limited to copy the full content of a previous frame header for the current picture, i.e. it is only used for redundant frame headers in the same picture. The syntax and semantics for the AV1 frame header for an open bitstream unit (OBU) is shown below.

| AV1 General frame header OBU syntax | |
|---|---|
| frame_header_obu( ) { | Type |
|   if ( SeenFrameHeader == 1 ) { | |
|     frame_header_copy( ) | |
|   } else { | |
|     SeenFrameHeader = 1 | |
|       uncompressed_header( ) | |
|     if ( show_existing_frame ) { | |
|       decode_frame_wrapup( ) | |
|       SeenFrameHeader = 0 | |
|     } else { | |
|       TileNum = 0 | |
|       SeenFrameHeader = 1 | |
|     } | |
|   } | |
| } | |

AV1 General Frame Header OBU Semantics

It is a requirement of bitstream conformance that a sequence header OBU has been received before a frame header OBU.

frame_header_copy is a function call that indicates that a copy of the previous frame_header_obu should be inserted at this point.

Note: Bitstreams may contain several copies of the frame_header_obu interspersed with tile_group_obu to allow for greater error resilience. However, the copies must contain identical contents to the original frame_header_obu.

If obu_type is equal to OBU_FRAME_HEADER, it is a requirement of bitstream conformance that SeenFrameHeader is equal to 0.

If obu_type is equal to OBU_REDUNDANT_FRAME_HEADER, it is a requirement of bitstream conformance that SeenFrameHeader is equal to 1.

Note: These requirements ensure that the first frame header for a frame has obu_type equal to OBU_FRAME_HEADER, while later copies of this frame header (if present) have obu_type equal to OBU_REDUNDANT_FRAME_HEADER.

TileNum is a variable giving the index (zero-based) of the current tile.

decode_frame_wrapup is a function call that indicates that the decode frame wrapup process specified in section 7.4 of the AV1 Bitstream & Decoding Process Specification should be invoked.

SUMMARY

The current version of VVC comprises a picture header that contains parameters that are common for one picture. However, many of these parameters often have the same value for multiple pictures in the bitstream, which causes signaling of redundant data which is wasteful from a compression point of view. If the value of a parameter is the same for all pictures in a CVS, then the parameter may instead be signaled in the SPS or the PPS. However, for the cases where the parameter is the same for most pictures but not for all, or the cases where it is difficult for the encoder in advance to determine if the parameter will be the same for all pictures in the CVS, the problem with redundant data remains.

In AV1, there is a functionality for copying the previous frame header in the bitstream. This functionality however, only allows for copying redundant frame headers for the same frame, not copying frame headers from a previous frame, i.e. the whole frame header is duplicated for the same picture for resilience reasons.

According to some embodiments of inventive concepts, a method for decoding a plurality of pictures from a bitstream is provided, the bitstream including a first segment header and a second segment header. The method includes decoding a first picture from the bitstream using first parameter values decoded from the first segment header. The method further includes decoding a second picture from the bitstream using second parameter values from the second segment header, wherein at least one second parameter value of the second parameter values from the second segment header is derived from a first parameter value of the first parameter values in the first segment header.

A primary advantage that may be obtained is avoiding sending redundant segment header data in the bitstream, and instead increasing the compression efficiency. This overhead of the redundant data may be especially noticeable for high frame rate video and/or video encoded at low bitrate.

Analogous decoder apparatus claims are provided.

According to some other embodiments of inventive concepts, a method for encoding a plurality of pictures into a bitstream is provided, the bitstream including a first segment header and a second segment header. The method includes encoding a first picture into the bitstream using first parameter values from the first segment header. The method further includes encoding a second picture into the bitstream using second parameter values from the second segment header, wherein at least one second parameter value of the second parameter values from the second segment header is a derived parameter value.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 6-7 are flow charts illustrating operations of a decoder according to some embodiments of inventive concepts;

FIGS. 8-9 are flow charts illustrating operations of an encoder according to some embodiments of inventive concepts.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 3:
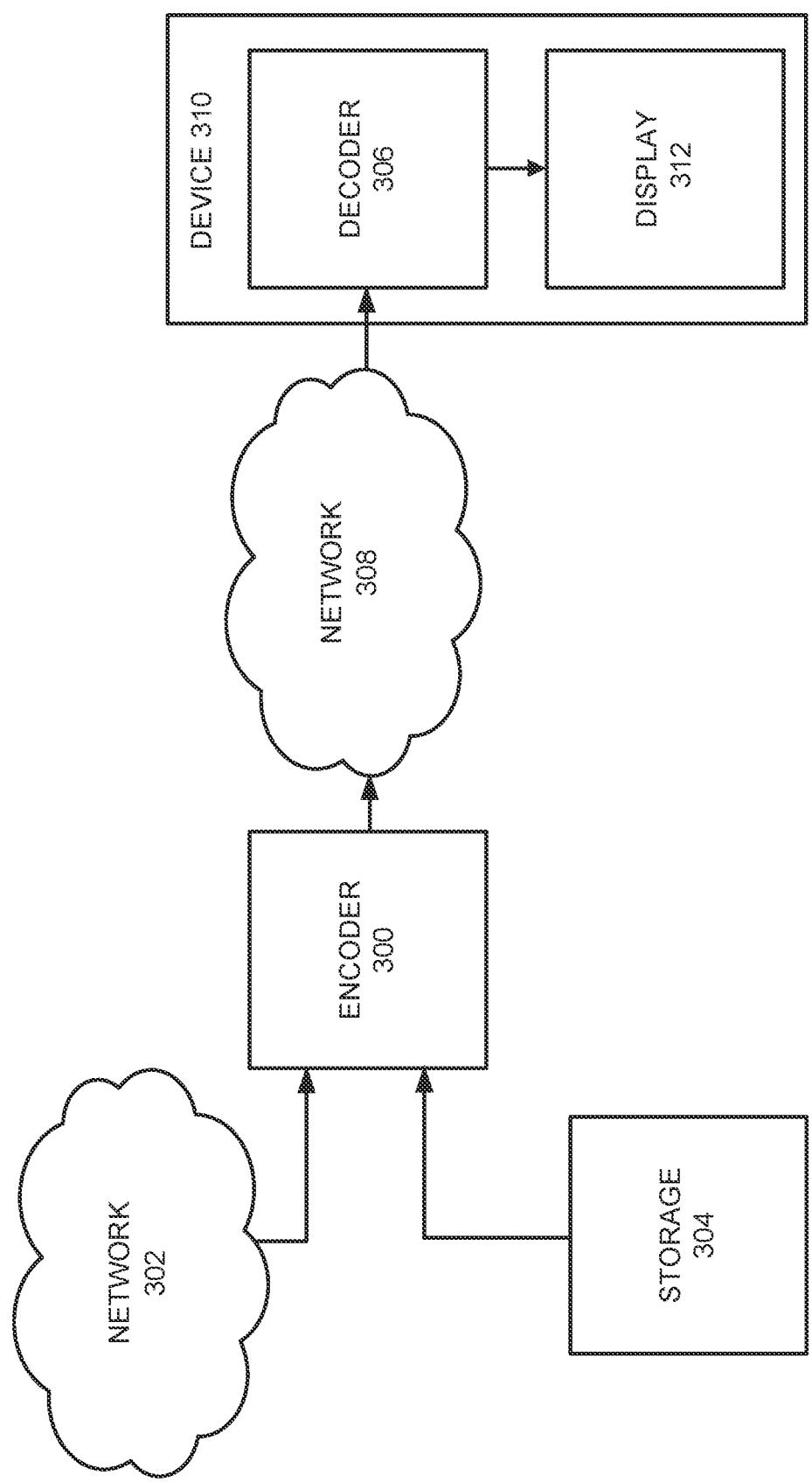
FIG. 3 is a block diagram illustrating an operating environment according to some embodiments of inventive concepts.

FIG. 3 illustrates an example of an operating environment of an encoder 300 that may be used to encode bitstreams as described herein. The encoder 300 receives media from network 302 and/or from storage 304 and encodes the media into bitstreams as described below and transmits the encoded media to decoder 306 via network 308. Storage device 304 may be part of a storage depository of videos such as a storage repository of a store or a streaming video service, a separate storage component, a component of a mobile device, etc. The decoder 306 may be part of a device 310 having a display 312. The device 310 may be a mobile device, a set-top device, a head-mounted display, and the like.

Figure 1:
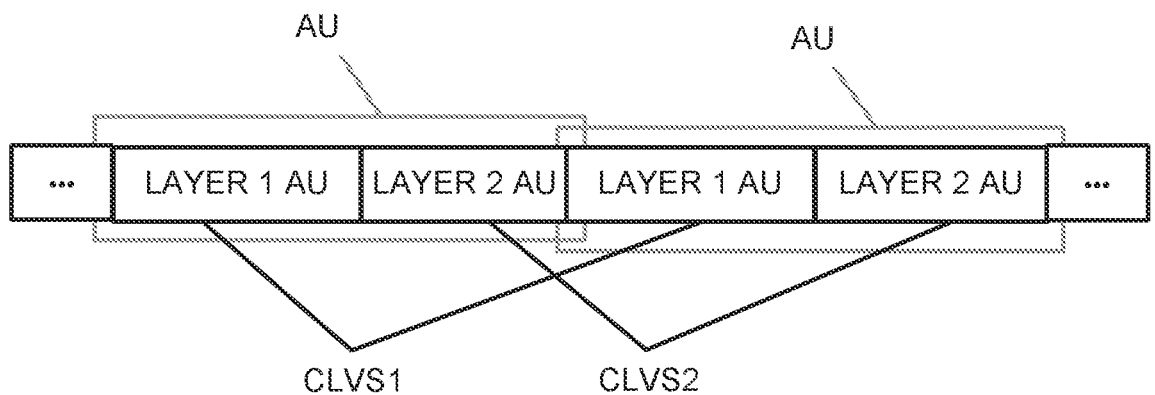
FIG. 1 is a diagram illustrating a relation between layer access units and coded layer video sequences according to some embodiments.
Figure 4:
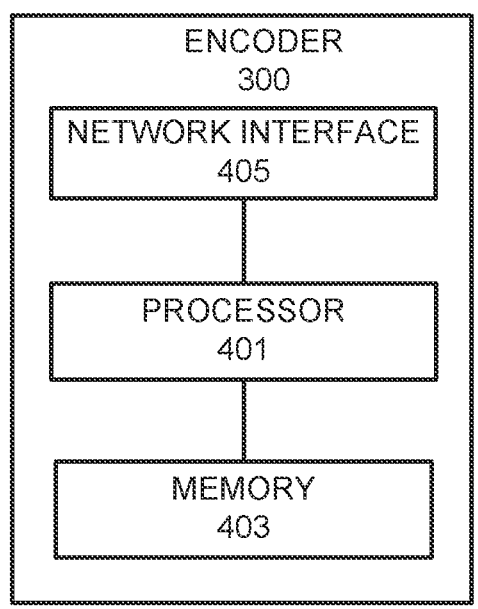
FIG. 4 is a block diagram illustrating an encoder according to some embodiments of inventive concepts.

FIG. 4 is a block diagram illustrating elements of encoder 300 configured to encode video frames according to some embodiments of inventive concepts. As shown, encoder 300 may include network interface circuitry 405 (also referred to as a network interface) configured to provide communications with other devices/entities/functions/etc. The encoder 300 may also include processor circuitry 401 (also referred to as a processor) coupled to the network interface circuitry 405, and a memory circuitry 403 (also referred to as memory) coupled to the processor circuit. The memory circuitry 403 may include computer readable program code that when executed by the processor circuitry 401 causes the processor circuit to perform operations according to embodiments disclosed herein.

According to other embodiments, processor circuitry 401 may be defined to include memory so that a separate memory circuit is not required. As discussed herein, operations of the encoder 300 may be performed by processor 401 and/or network interface 405. For example, processor 401 may control network interface 405 to transmit communications to decoder 306 and/or to receive communications through network interface 405 from one or more other network nodes/entities/servers such as other encoder nodes, depository servers, etc. Moreover, modules may be stored in memory 403, and these modules may provide instructions so that when instructions of a module are executed by processor 401, processor 401 performs respective operations.

Figure 5:
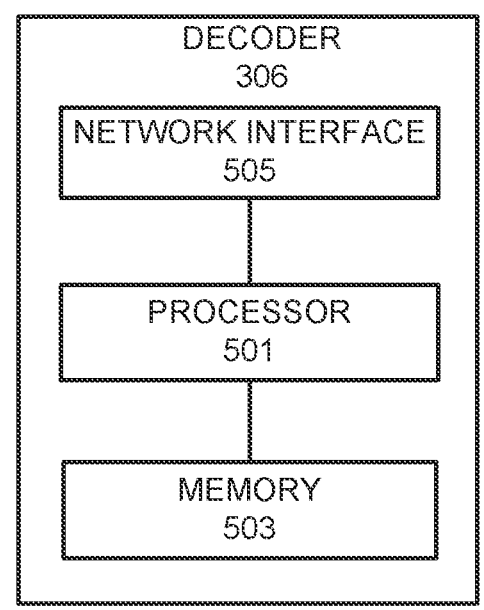
FIG. 5 is a block diagram illustrating a decoder according to some embodiments of inventive concepts.

FIG. 5 is a block diagram illustrating elements of decoder 306 configured to decode video frames according to some embodiments of inventive concepts. As shown, decoder 306 may include a network interface circuit 505 (also referred to as a network interface) configured to provide communications with other devices/entities/functions/etc. The decoder 306 may also include processor circuitry 501 (also referred to as a processor) coupled to the network interface circuit 505, and a memory circuit 503 (also referred to as memory) coupled to the processor circuit. The memory circuitry 503 may include computer readable program code that when executed by the processor circuitry 501 causes the processor circuit to perform operations according to embodiments disclosed herein.

According to other embodiments, processor circuitry 501 may be defined to include memory so that a separate memory circuit is not required. As discussed herein, operations of the decoder 306 may be performed by processor 501 and/or network interface 505. For example, processor 501 may control network interface 505 to receive communications from encoder 300. Moreover, modules may be stored in memory 503, and these modules may provide instructions so that when instructions of a module are executed by processor 501, processor 501 performs respective operations.

As previously indicated, the current version of VVC comprises a picture header that contains parameters that are common for one picture. However, many of these parameters often have the same value for multiple pictures in the bitstream, which causes signaling of redundant data which is wasteful from a compression point of view. If the value of a parameter is the same for all pictures in a CVS, then the parameter may instead be signaled in the SPS or the PPS. However, for the cases where the parameter is the same for most pictures but not for all, or the cases where it is difficult for the encoder in advance to determine if the parameter will be the same for all pictures in the CVS, the problem with redundant data remains.

Additionally, in AV1, there is a functionality for copying the previous frame header in the bitstream. This functionality however, only allows for copying redundant frame headers for the same frame, not copying frame headers from a previous frame, i.e. the whole frame header is duplicated for the same picture for resilience reasons.

To avoid sending redundant segment header data in the bitstream, some embodiments of inventive concepts predict parameters of a segment header (e.g. picture header or alike) from a segment header of a previously decoded picture.

In a first embodiment of inventive concepts, parameters of a segment header may be predicted from a segment header in the closest preceding picture in decoding order. Parameters of a segment header may alternatively be predicted from a segment header in the closest preceding picture in decoding order, for which at least one of the following is the same for the current picture and the picture that is predicted from:

Picture type
Layer identifier
Temporal sublayer identifier

In a second embodiment of inventive concepts, a segment header identifier is used to determine from which segment header in which picture to predict segment header parameters to the current segment header. In a preferred version of this embodiment the segment header identifier is the picture order count (POC) of the picture associated with the segment header to predict from.

In a third embodiment of inventive concepts, the previously decoded picture to predict the parameters from is identified as a picture in a reference picture list. In one version of this embodiment, segment header prediction is only enabled if the reference picture list is signaled in the segment header.

In a fourth embodiment of inventive concepts, various ways of storing the parameters that may be predicted in the decoder are discussed.

In a fifth embodiment of inventive concepts, an indicator value, e.g. a flag, is signaled in a parameter set, e.g. SPS, VPS or DPS, where the indicator value indicates whether segment header parameter prediction may be used or not in the bitstream (or in the CVS in case of SPS).

In a sixth embodiment of inventive concepts, details of what parameters to predict in a segment header is given. The parameters to predict may also be grouped.

A primary advantage that may be obtained is to avoid sending redundant segment header data in the bitstream, and instead increase the compression efficiency. This overhead of the redundant data may be especially noticeable for high frame rate video and/or video encoded at low bitrate.

Compared to the frame header copy solution in AV1, the inventive concepts described herein may predict parameters from segment headers in previous pictures. In addition, not all parameters need to be predicted, and parameters may be predicted from different pictures.

The term "segment" used herein may refer to picture, frame, field, image or similar concept describing a still image in a video. The term "segment header" may thus for instance refer to picture header, frame header, field header or image header.

Note that in each embodiment of inventive concepts described below, predicting parameters for a current segment header based on parameters from a segment header of a preceding picture in decoding order may include using a copy method, a prediction method, and/or an overwrite method. The term "predict" is used interchangeably with the term "derive" in this description, e.g. when we refer to predicting a parameter value from another parameter value this also means deriving a parameter value from, or based on, another parameter value.

In the copy method, parameter values are copied as-is from a previous segment header. For example, assume that a segment header S in a preceding picture used virtual boundaries with a set of virtual boundaries parameter values. When decoding the segment header C of the current picture, the decoder decodes which segment header of which preceding picture to use for the virtual boundaries parameter prediction. The decoder then copies or uses the same virtual boundaries parameter values for segment header C that were used for segment header S.

In the prediction method, parameter values from a segment header in a previous picture are used as a prediction for the current segment header and derive final parameter values by using both values from the segment header of the previous picture and values signaled for the current segment header.

For example, assume that a segment header S of a preceding picture used virtual boundaries with a set of virtual boundaries parameter values. When decoding the current segment header C, the decoder decodes which segment header of which preceding picture to use for virtual boundaries parameter prediction. For at least one virtual boundaries parameter in the set of virtual boundaries parameters, the decoder then decodes a virtual boundaries parameter delta value and combines this value with the corresponding virtual boundaries parameter value that was used in segment header S. Preferably the combination is done by addition or subtraction (differential coding) and done for multiple virtual boundaries parameter values.

In the overwrite method, parameter values from a segment header of a preceding picture may be overwritten by values signaled in the current segment header. For example, assume that a segment header S of a previous picture used virtual boundaries with a set of virtual boundaries parameter values. When decoding the current segment header C, the decoder decodes which previous segment header of which preceding picture to use for virtual boundaries parameter prediction. For at least one virtual boundaries parameter in the set of virtual boundaries parameters, the decoder decodes a parameter value from the data of the current segment header C and uses this parameter value as is. For at least one virtual boundaries parameter in the set of virtual boundaries parameters, the decoder uses either method 1) or 2) above.

Any combination of the copy, prediction, and overwrite methods can be used. For instance, the copy and prediction methods can be combined in which some parameters are copied and some parameters are predicted.

Figure 2:
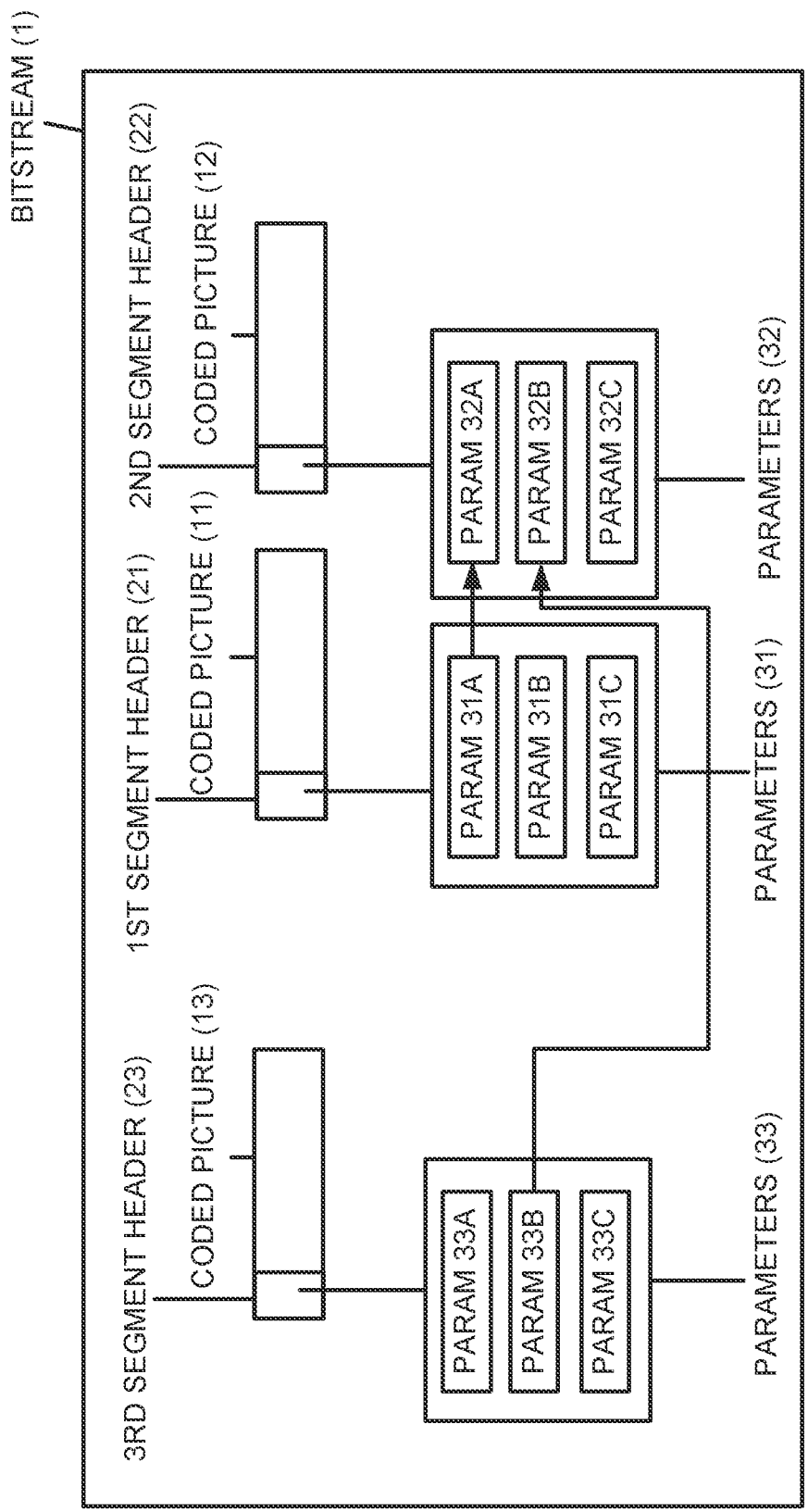
FIG. 2 is a block diagram illustrating segment header prediction according to some embodiments of inventive concepts.

Embodiment 1—Predict One or More Parameters from a Segment Header in a Previously Decoded Picture Turning to FIG. 2, in a first embodiment of inventive concepts, a picture is decoded from a bitstream (1), wherein one or more parameters (32) in a segment header (22) of a current picture (12) are predicted from one or more parameters (31, 33) in one or more segment headers (21, 23) belonging to one or more coded pictures (11, 13) preceding the current picture (12) in decoding order.

In one version of this first embodiment of inventive concepts, a parameter (32A) in the segment header (22) of a current picture (12) is predicted from a parameter (31A) in a segment header (21) of the picture (11) preceding the current picture (12) in decoding order. In another version of this embodiment a parameter (32B) in the segment header (22) is predicted from a parameter (33B) in a segment header of the closest preceding picture in decoding order having the same picture type as the current picture (12). In yet another version of this embodiment a parameter (32B) in the segment header (22) is predicted from a parameter (33B) in a segment header of the closest preceding picture in decoding order having the same temporal sublayer identifier and/or layer identifier as the current coded picture (12). There may also be another parameter (32C) in the segment header (21) of the current coded picture (12) which is not predicted from any other segment header.

Below are example syntax and semantics for the segment header prediction in the first embodiment of inventive concepts.

| | Descriptor |
|---|---|
| segment_header_rbsp( ) { | |
| ... | |
| segment_header_prediction_enabled_flag | u(1) |
| if ( !segment_header_prediction_enabled_flag ) | |
|   param_A | u(v) |
| ... | |
| param_C | u(v) |
| } | | segment_header_prediction_enabled_flag equal to 1 specifies that the value of param_A is predicted from the segment header of the picture directly preceding the current picture in decoding order. segment_header_prediction_enabled_flag equal to 0 specifies that the value of param_A is signaled in the segment header of the current picture.

In an alternate embodiment, segment_header_prediction_enabled_flag equal to 1 specifies that the value of param_A is predicted from the segment header of the closest preceding picture in decoding order with the same picture type as the current picture. segment_header_prediction_enabled_flag equal to 0 specifies that the value of param_A is signaled in the segment header of the current picture.

In a further alternate embodiment, segment_header_prediction_enabled_flag equal to 1 specifies that the value of param_A is predicted from the segment header of the closest preceding picture in decoding order with the same temporal sublayer ID and layer ID as the current picture. segment_header_prediction_enabled_flag equal to 0 specifies that the value of param_A is signaled in the segment header of the current picture.

All parameters that are predicted in a segment header may be predicted from a single segment header of a previous picture. The single segment header to predict from may for instance be identified:
1) as the segment header of the closest preceding picture in decoding order,
2) as the segment header of the closest preceding picture in decoding order for which at least one of picture type, layer ID and temporal sublayer ID is the same as for the current picture, or
3) by any other method described in the following embodiments.

All parameters in the segment header (22) do not have to be predicted from the segment header in the same preceding picture. In one version of the first embodiment of inventive concepts, a parameter (32A) in a second segment header (22) is predicted from a parameter (31A) in a first segment header (21) and another parameter (32B) in the second segment header (22) is predicted from a parameter (33B) in a third segment header (23) of a coded picture (33) preceding the current coded picture (13).

When predicting parameters of a current segment header from multiple previously decoded segment headers, the multiple segment headers may for instance be identified:
1) as the segment headers of the two or more closest preceding pictures in decoding order,
2) as the segment headers of the two or more closest preceding pictures in decoding order for which at least one of picture type, layer ID and temporal sublayer ID is the same as for the current picture, or
3) by any other method described in the following embodiments with the addition that two or more identifiers are used to identify the two or more segment headers to predict from, e.g. two or more segment header ids, POC values, reference picture list index The prediction of a parameter may also be done from more than one parameter in segment headers of more than one preceding picture. In this version of the first embodiment of inventive concepts, a parameter (32A) of a second segment header (22) may be predicted from a parameter (31A) in a first segment header (21) and a parameter (33A) in a third segment header (23). A parameter (32A) in the current segment header (22) may for instance be derived as the average, the median, the minimum, the maximum or by using some other function of the corresponding parameters (32A, 33A) in the segment headers (21, 23) of more than one preceding picture (11, 13).

The prediction of parameters may also be chained, meaning that the parameter that is being predicted from has in turn been predicted from other parameters of another segment header in a preceding picture, and so on. In this version of the first embodiment of inventive concepts, a parameter (32A) in a second segment header (22) is predicted from a first parameter (31A) in a first segment header (21) where the first parameter has been predicted from a third parameter (33A) in a third segment header (23). In one version of the embodiment, the length of the prediction chain could for instance be limited to a certain value for resilience purposes. In one version, the prediction length could be 1, meaning that the prediction of a parameter could be limited to only allow prediction from a parameter in a segment header in a preceding picture for which that parameter has not been predicted from any previous segment header.

Embodiments 2 and 3 Described Below Describe Additional Ways to Identify the Segment Header to Predict a Parameter from In the examples described above, only one parameter is predicted from each segment header of a preceding picture. More than one parameter may be predicted. The parameters may also be grouped. A syntax element, e.g. a flag, may be used to determine whether the parameters in a group are predicted or not. For instance, if the syntax element has a certain value, e.g. 1, then the parameters in the group are predicted from parameters in a segment header of a preceding picture. Otherwise, if the syntax element has another value, e.g. 0, then the parameters in the group are not predicted from a previous segment header.

Below are example syntax and semantics for the segment header prediction with grouped parameters.

| | Descriptor |
|---|---|
| segment_header_rbsp( ) { | |
| ... | |
|    segment_header_prediction_groupA_enabled_flag | u(1) |
|    if ( !segment_header_prediction_groupA_enabled_flag ) | |
|    { | |
|      param_A1 | u(v) |
|      param_A2 | u(v) |
|      ... | |
|      param_AN | u(v) |
|    } | |
|    ... | |
|    segment_header_prediction_groupB_enabled_flag | u(1) |
|    if ( !segment_header_prediction_groupB_enabled_flag ) | |
|    { | |
|      param_B1 | u(v) |
|      param_B2 | u(v) |
|      ... | |
|      param_BM | u(v) |
|    } | |
|    ... | |
| } | | segment_header_prediction_groupA_enabled_flag equal to 1 specifies that the values of param_A1, param_A2, . . . , param_AN are predicted from the segment header of the closest preceding picture in decoding order with the same temporal sublayer ID and layer ID as the current picture. segment_header_prediction_groupA_enabled_flag equal to 0 specifies that the values of param_A, param_A2, . . . , param_AN are signaled in the segment header of the current picture.

segment_header_prediction_groupB_enabled_flag equal to 1 specifies that the values of param_B1, param_B2, . . . , param_BM are predicted from the segment header of the closest preceding picture in decoding order with the same temporal sublayer ID and layer ID as the current picture. segment_header_prediction_groupB_enabled_flag equal to 0 specifies that the values of param_B, param_B2, . . . , param_BM are signaled in the segment header of the current picture.

In the above example, parameters are predicted from segment headers. 'Prediction' of a parameter value can refer to 'copying' the parameter value from a segment header of a previous picture. 'Prediction' of a parameter could also refer to 'differential code', or delta code, a parameter from a segment header of a previous picture. For sake of clarity, an explicit corresponding example with syntax and semantics comprising delta coded syntax elements is shown below.

| | Descriptor |
|---|---|
| segment_header_rbsp( ) { | |
| ... | |
|    segment_header_prediction_groupA_enabled_flag | u(1) |
|    if ( segment_header_prediction_groupA_enabled_flag ) { | |
|      delta_param_A1 | u(v) |
|      delta_param_A2 | u(v) |
|      ... | |
|      delta_param_AN | u(v) |
|    } else { | |
|      param_A1 | u(v) |
|      param_A2 | u(v) |
|      ... | |
|      param_AN | u(v) |
|    } | |
|    ... | |
|    segment_header_prediction_groupB_enabled_flag | u(1) |
|    if ( segment_header_prediction_groupB_enabled_flag ) { | |
|      delta_param_B1 | u(v) |
|      delta_param_B2 | u(v) |
|      ... | |
|      delta_param_BN | u(v) |
|    } else { | |
|      param_B1 | u(v) |
|      param_B2 | u(v) |
|      ... | |
|      param_BM | u(v) |
|    } | |
|    ... | |
| } | | segment_header_prediction_groupA_enabled_flag equal to 1 specifies that the values of param_A1, param_A2, . . . , param_AN are differential coded from the segment header of the closest preceding picture in decoding order with the same temporal sublayer ID and layer ID as the current picture.

segment_header_prediction_groupA_enabled_flag equal to 0 specifies that the values of param_A, param_A2, . . . , param_AN are signaled in the segment header of the current picture. If segment_header_prediction_groupA_enabled_flag equals 0 the parameter ParamAX, where X is in 1 to N, is set to param_AX. If segment_header_prediction_groupA_enabled_flag equals 1 the parameter ParamAX is derived as param_AX from the closest preceding picture minus delta_param_AX of the current picture.

segment_header_prediction_groupB_enabled_flag equal to 1 specifies that the values of param_B1, param_B2, . . . , param_BM are differential coded from the segment header of the closest preceding picture in decoding order with the same temporal sublayer ID and layer ID as the current picture.

segment_header_prediction_groupB_enabled_flag equal to 0 specifies that the values of param_B, param_B2, . . . , param_BM are signaled in the segment header of the current picture. If segment_header_prediction_groupB_enabled_flag equals 0 the parameter ParamBX, where X is in 1 to N, is set to param_BX. If segment_header_prediction_groupB_enabled_flag equals 1 the parameter ParamBX is derived as param_BX from the closest preceding picture minus delta_param_BX of the current picture.

In the following examples in this embodiment and the following embodiments the term 'predict' is used, but it is to be understood that 'predict' could mean either 'copy' or 'differential code' as discussed above.

A decoder may perform a subset or all of the following steps for this embodiment to decode one or more pictures from a bitstream, where the bitstream comprises at least two (or three) coded pictures, each coded picture having at least one segment header:
 1. Decode a first picture using parameter values from a first segment header (e.g. picture header or slice header)
 2. Decode a third picture using parameter values from a third segment header
 3. Decode a second picture using parameter values from a second segment header
   wherein at least one parameter value of the second segment header is predicted from a parameter value in the first segment header and/or at least one parameter value of the second segment header is predicted from a parameter value in the third segment header.

In one embodiment where the segment header is a picture header and a picture consist of slices that each comprises a slice header, a decoder may perform a subset or all of the following steps to decode a first and a second picture from a bitstream:
 1. Decode a first picture header from the bitstream
 2. Decode a first picture, associated with the first picture header, from the bitstream using parameter values from the first picture header
 3. Decode a second picture header from the bitstream
 4. Decode a first slice of a second picture from the bitstream, wherein
   a. the second picture is associated with the second picture header and,
   b. the first slice comprises a first slice header and,
   c. at least one parameter value A of the second picture header is predicted from a parameter value in the first picture header and
   d. decoding the first slice comprises using at least one value decoded from the first slice header and the at least one parameter value A
 5. Decode a second slice of the second picture from the bitstream, wherein
   a. the second slice comprises a second slice header and,
   b. decoding the second slice comprises using at least one value decoded from the second slice header and the at least one parameter value A.

An encoder may perform a subset or all of the following steps for this embodiment to encode one or more pictures into a bitstream, where the bitstream comprises at least two (or three) coded pictures, each coded picture having at least one segment header:
 1. Determine parameter values for a first segment header of a first picture
 2. Encode the first segment header to the bitstream
 3. Encode the first picture based on the first segment header to the bitstream
 4. Determine parameter values for a third segment header of a third picture
 5. Encode the third segment header to the bitstream
 6. Encode the third picture based on the third segment header to the bitstream
 7. Determine parameter values for a second segment header, wherein at least one parameter value is predicted from a parameter value in the first segment header and/or at least one parameter value is predicted from a parameter value in the third segment header
 8. Encode the second segment header to the bitstream
 9. Encode the second picture based on the second segment header to the bitstream Embodiment 2 of inventive concepts—Mechanisms for picture header identification such as picture ID sent with picture header and syntax element in the current picture header identifying which picture header to use for prediction.

In a second embodiment of inventive concepts, based on the first embodiment, each segment header is associated with a unique identifier. In a preferred version of this embodiment of inventive concepts, the identifier is signaled in the segment header. In other versions of this embodiment of inventive concepts, the identifier may be signaled in a parameter set such as SPS or PPS. The unique identifier is used to determine a segment header to predict one or more parameters from. In one version of this embodiment, only one segment header is allowed per picture and thus the unique identifier uniquely identifies both the picture and the segment header.

In one version of this embodiment, one or more syntax element is signaled in the current segment header that identifies which segment header in which picture to predict one or more parameters from, e.g. the one or more syntax element is a picture identifier identifying the picture of the segment header, assuming there is only one segment header per picture. In case more than one segment headers per picture are allowed the one or more syntax elements could comprise a segment header identifier. In other versions of this embodiment, this information may be signaled in a parameter set such as SPS or PPS, or be implicitly derived. In one version of this embodiment, if the value of the one or more syntax element is identical to a unique identifier of a segment header in a previously decoded picture, then that segment header is determined to be the segment header to predict the parameters from.

Below are example syntax and semantics for the segment header prediction using a segment header ID.

|  | Descriptor |
|---|---|
| segment_header_rbsp( ) { | |
| ... | |
|   segment_header_id | u(v) |
| ... | |
|   segment_header_prediction_enabled_flag | u(1) |
|   if ( segment_header_prediction_enabled_flag ) | |
|     predicted_segment_header_id | u(v) |
|   else | |
|     param_A | u(v) |
| ... | |
|   param_C | u(v) |
| } | | segment_header_id specifies the identifier value for the segment header.

segment_header_prediction_enabled_flag equal to 1 specifies that the value of param_A is predicted from the segment header with identifier value equal to predicted_segment_header_id. segment_header_prediction_enabled_flag equal to 0 specifies that the value of param_A is signaled in the segment header of the current picture.

predicted_segment_header_id specifies the identifier value for the segment header from which the value of param_A is predicted from.

In an alternative example, the picture order count value is used for identifying the segment header to predict from.

| Descriptor |  |
|---|---|
| segment_header_rbsp( ) { |  |
| ... |  |
| segment_header_pic_order_cnt_lsb | u(v) |
| ... |  |
| segment_header_prediction_enabled_flag | u(1) |
| if ( segment_header_prediction_enabled_flag ) |  |
|    predicted_segment_header_pic_order_cnt_lsb | u(v) |
| else |  |
|    paramA | u(v) |
| ... |  |
| param_C | u(v) |
| } |  | segment_header_pic_order_cnt_lsb specifies the least significant bits of the picture order count of the picture associated with the segment header.

segment_header_prediction_enabled_flag equal to 1 specifies that the value of param_A is predicted from the segment header with identifier value equal to predicted_segment_header_id. segment_header_prediction_enabled_flag equal to 0 specifies that the value of param_A is signaled in the segment header of the current picture.

predicted_segment_header_pic_order_cnt_lsb specifies the least significant bits of the picture order count of the picture for the segment header from which the value of param_A is predicted from.

Embodiment 3—Use RPL to Determine What Previous Segment Header that are Available for Prediction In a third embodiment of inventive concepts, based on the first embodiment of inventive concepts, the picture for the segment header to predict the one or more parameters from is selected from a set of pictures that are actively available for prediction for the current picture. This may ensure the availability of the picture for which the segment header belongs to. The picture may for instance be determined using an index in an ordered list of the set of pictures. The set of pictures that are actively available for prediction of the current picture may for example be one of the following sets:
- The set of pictures in the DPB (decoded picture buffer) that is present in an active part of a reference picture list.
- The set of pictures in the DPB that are marked either as a short-term picture or a long-term picture.
- The set of pictures in the DPB that are available for Inter prediction of the current picture.

Note that in the current version of VVC, one or two reference picture lists are signaled either in the picture header or for each slice header of the picture, conditioned on the pic_rpl_present_flag signaled in the picture header. In one version of this embodiment of inventive concepts, picture header prediction is only enabled if a reference picture list is signaled in the picture header. In another version of this embodiment, picture header prediction may be enabled even if a reference picture list is not signaled in the picture header. The picture to predict from is then derived from a reference picture list signaled in e.g. SPS.

Below are example syntax and semantics for the segment header prediction using reference picture list on top of the current VVC draft, where a segment header is a picture header. In this example, picture header prediction is only enabled if the reference picture list is signaled in the picture header.

| Descriptor |  |
|---|---|
| picture_header_rbsp( ) { |  |
| ... |  |
| pic_rpl_present_flag | u(1) |
| if ( pic_rpl_present_flag ) |  |
| { |  |
| ... |  |
|    picture_header_prediction_enabled_flag | u(1) |
|    ... |  |
| } |  |
| if (picture_header_prediction_enabled_flag ) |  |
| { |  |
|    if ( rpl1_idx_present_flag ) |  |
|      picture_header_prediction_rpl | u(1) |
|      picture_header_prediction_rpl_idx | u(v) |
| } |  |
| else |  |
|    param_A | u(v) |
| ... |  |
| param_C | u(v) |
| } |  | pic_rpl_present_flag equal to 1 specifies that reference picture list signalling is present in the picture header. pic_rpl_present_flag equal to 0 specifies that reference picture list signalling is not present in the picture header and may be present in slice headers of slices of the picture.

picture_header_prediction_enabled_flag equal to 1 specifies that the value of param_A is predicted from the picture header for the picture with index picture_header_prediction_rpl_idx in reference picture list picture_header_predicition_rpl. segment_header_prediction_enabled_flag equal to 0 specifies that the value of param_A is signaled in the segment header of the current picture.

picture_header_predicition_rpl equal to 0 specifies that reference picture list L0 is used to determine the picture to predict picture header parameters from. picture_header_predicition_rpl equal to 1 specifies that reference picture list L1 is used to determine the picture to predict picture header parameters from. When not present, picture_header_prediction_rpl is inferred to be equal to 0.

picture_header_prediction_rpl_idx[i] specifies the index of the picture in the reference picture list i, from which picture header parameters are predicted.

Embodiment 4—Details on how to Store the Information in the Decoder

In a fourth embodiment of inventive concepts, various ways of storing the segment header parameters in the decoder are possible.

In one version of the fourth embodiment of inventive concepts, the parameters are stored in a memory slot controlled by the decoded picture buffer management. E.g. whenever a picture is removed from the decoded picture buffer (DPB), the segment header associated with the picture is also removed from memory.

Embodiment 5—Signal in SPS, VPS or DPS Whether Picture Prediction May be Available In a fifth embodiment of inventive concepts, an indicator value, e.g. a flag, is signaled in a parameter set, e.g. SPS, VPS or DPS, where the indicator value indicates whether segment header parameter prediction may be used or not in the bitstream (or CVS in case of SPS).

Embodiment 6—Details of which Parameters to Predict

The parameters to predict from a segment header of a preceding picture in any of the previous embodiments may include one or more of the picture header parameters in the current version of VVC. The parameters to predict may also include one or more of the slice header parameters in the current version of VVC.

The parameters to predict may for instance come from any of the following group of parameters; gradual decoding refresh (GDR) parameters, picture order count (POC) parameters, subpicture parameters, loop-filter across virtual boundaries parameters, reference picture list (RPL) parameters, partition constraint override parameters, quantization parameter (QP) parameters, sample adaptive offset (SAO) parameters, adaptive loop filter (ALF) parameters, deblocking filter parameters, luma mapping and chroma scaling (LMCS) parameters or scaling list parameters.

Below are example syntax and semantics for the picture header prediction of grouped parameters using reference picture list on top of the current VVC draft. In this example, picture header prediction may also be used even if the reference picture list is not signaled in the picture header. Added syntax text compared to the current VVC draft is double-underlined and removed syntax text is crossed out.

| | Descriptor |
|---|---|
| picture_header_rbsp( ) { | |
|   non_reference_picture_flag | u(1) |
|   gdr_pic_flag | u(1) |
|   no_output_of_prior_pics_flag | u(1) |
|   if( gdr_pic_flag ) | |
|     recovery_poc_cnt | ue(v) |
|   ph_pic_parameter_set_id | ue(v) |
|   if( sps_poc_msb_flag ) { | |
|     ph_poc_msb_present_flag | u(1) |
|     if( ph_poc_msb_present_flag ) | |
|       poc_msb_val | u(v) |
|   } | |
|   if( sps_subpic_id_present_flag && !sps_subpic_id_signalling_flag ) { | |
|     ph_subpic_id_signalling_present_flag | u(1) |
|     if( ph_subpics_id_signalling_present_flag ) { | |
|       ph_subpic_id_len_minus1 | ue(v) |
|       for( i = 0; i <= sps_num_subpics_minus1; i++ ) | |
|         ph_subpic_id[ i ] | u(v) |
|     } | |
|   } | |
| ~~if( !sps_loop_filter_across_virtual_boundaries_disabled_present_flag ) {~~ | |
|   ~~ph_loop_filter_across_virtual_boundaries_disabled_present_flag~~ | ~~u(1)~~ |
| ~~if( ph_loop_filter_across_virtual_boundries_disabled_present_flag ) {~~ | |
|   ~~ph_num_ver_virtual_boundaries~~ | ~~u(2)~~ |
|   ~~for( i = 0; i < ph_num_ver_virtual_boundaries; i++ )~~ | |
|     ~~ph_virtual_boundaries_pos_x[ i ]~~ | ~~u(13)~~ |
|   ~~ph_num_hor_virtual_boundaries~~ | ~~u(2)~~ |
|   ~~for( i = 0; i < ph_num_hor_virtual_boundaries; i++ )~~ | |
|     ~~ph_virtual_boundaries_pos_y[ i ]~~ | ~~u(13)~~ |
| ~~}~~ | |
| ~~}~~ | |
|   if( separate_colour_plane_flag == 1 ) | |
|     colour_plane_id | u(2) |
|   if( output_flag_present_flag ) | |
|     pic_output_flag | u(1) |
|   pic_rpl_present_flag | u(1) |
|   if( pic_rpl_present_flag ) { | |
|     for( i = 0; i < 2; i++ ) { | |
|       if( num_ref_pic_lists_in_sps[ i ] > 0 && !pps_ref_pic_list_sps_idc[ i ] && | |
|         ( i == 0 \|\| ( i == 1 && rpl1_idx_present_flag ) ) ) | |
|       pic_rpl_sps_flag[ i ] | u(1) |
|       if( pic_rpl_sps_flag[ i ] ) { | |
|         if( num_ref_pic_lists_in_sps[ i ] > 1 && | |
|           ( i == 0 \|\| ( i == 1 && rpl1_idx_present_flag ) ) ) | |
|         pic_rpl_idx[ i ] | u(v) |
|       } else | |
|         ref_pic_list_struct( i, num_ref_pic_lists_in_sps[ i ] ) | |
|       for( j = 0; j < NumLtrpEntries[ i ][ RplsIdx[ i ] ]; j++ ) { | |
|         if( ltrp_in_slice_header_flag[ i ][ RplsIdx[ i ] ] ) | |
|           pic_poc_lsb_lt[ i ][ j ] | u(v) |
|         pic_delta_poc_msb_present_flag[ i ][ j ] | u(1) |
|         if( pic_delta_poc_msb_present_flag[ i ][ j ] ) | |
|           pic_delta_poc_msb_cycle_lt[ i ][ j ] | ue(v) |
|       } | |
|     } | |
|   } | |
|   <u>picture_header_prediction_enabled_flag</u> | <u>u(1)</u> |
|   <u>if(picture_header_prediction_enabled_flag)</u> | |

-continued

| Descriptor |
|---|

```
{
    picture_header_prediction_rpl                                         u(1)
    picture_header_prediction_rpl_idx                                     u(v)
    if(!sps_loop_filter_across_virtual_boundaries_disabled_present_flag)
        ph_predict_loop_filter_across_virtual_boundaries_params_flag      u(1)
    if(partition_constraints_override_enabled_flag)
        ph_predict_partition_constraint_override_params_flag              u(1)
    if(cu_qp_delta_enabled_flag)
        ph_predict_cu_qp_delta_params_flag                                u(1)
    if(pps_cu_chroma_qp_offset_list_enabled_flag)
        ph_predict_chroma_qp_offset_list_params_flag                      u(1)
    if(sps_alf_enabled_flag)
        ph_predict_alf_params_flag                                        u(1)
    if(deblocking_filter_override_enabled_flag)
        ph_predict_deblocking_filter_override_params_flag                 u(1)
}
if(!sps_loop_filter_across_virtual_boundaries_disabled_present_flag&&
!ph_predict_loop_filter_across_virtual_boundaries_params_flag){
    ph_loop_filter_across_virtual_boundaries_disabled_present_flag        u(1)
    if(ph_loop_filter_across_virtual_boundaries_disabled_present_flag){
        ph_num_ver_virtual_boundaries                                     u(2)
        for(i=0;i<ph_num_ver_virtual_boundaries;i++)
            ph_virtual_boundaries_pos_x[ i ]                              u(13)
        ph_num_hor_virtual_boundaries                                     u(2)
        for(i=0;i<ph_num_hor_virtual_boundaries;i++)
            ph_virtual_boundaries_pos_y[ i ]                              u(13)
    }
}
if( partition_constraints_override_enabled_flag &&
!ph_predict_partition_constraint_override_params_flag ) {
    partition_constraints_override_flag                                   u(1)
    if( partition_constraints_override_flag ) {
        pic_log2_diff_min_qt_min_cb_intra_slice_luma                      ue(v)
        pic_log2_diff_min_qt_min_cb_inter_slice                           ue(v)
        pic_max_mtt_hierarchy_depth_inter_slice                           ue(v)
        pic_max_mtt_hierarchy_depth_intra_slice_luma                      ue(v)
        if( pic_max_mtt_hierarchy_depth_intra_slice_luma != 0 ) {
            pic_log2_diff_max_bt_min_qt_intra_slice_luma                  ue(v)
            pic_log2_diff_max_tt_min_qt_intra_slice_luma                  ue(v)
        }
        if( pic_max_mtt_hierarchy_depth_inter_slice != 0 ) {
            pic_log2_diff_max_bt_min_qt_inter_slice                       ue(v)
            pic_log2_diff_max_tt_min_qt_inter_slice                       ue(v)
        }
        if( qtbtt_dual_tree_intra_flag ) {
            pic_log2_diff_min_qt_min_cb_intra_slice_chroma                ue(v)
            pic_max_mtt_hierarchy_depth_intra_slice_chroma                ue(v)
            if( pic_max_mtt_hierarchy_depth_intra_slice_chroma != 0 ) {
                pic_log2_diff_max_bt_min_qt_intra_slice_chroma            ue(v)
                pic_log2_diff_max_tt_min_qt_intra_slice_chroma            ue(v)
            }
        }
    }
}
if( cu_qp_delta_enabled_flag &&!ph_predict_cu_qp_delta_params_flag ) {
    pic_cu_qp_delta_subdiv_intra_slice                                    ue(v)
    pic_cu_qp_delta_subdiv_inter_slice                                    ue(v)
}
if( pps_cu_chroma_qp_offset_list_enabled_flag &&
!ph_predict_chroma_qp_offset_list_params_flag ) {
    pic_cu_chroma_qp_offset_subdiv_intra_slice                            ue(v)
    pic_cu_chroma_qp_offset_subdiv_inter_slice                            ue(v)
}
if( sps_temporal_mvp_enabled_flag )
    pic_temporal_mvp_enabled_flag                                         u(1)
if(!pps_mvd_l1_zero_idc )
    mvd_l1_zero_flag                                                      u(1)
if( !pps_six_minus_max_num_merge_cand_plus1 )
    pic_six_minus_max_num_merge_cand                                      ue(v)
if( sps_affine_enabled_flag )
    pic_five_minus_max_num_subblock_merge_cand                            ue(v)
if( sps_fpel_mmvd_enabled_flag )
    pic_fpel_mmvd_enabled_flag                                            u(1)
if( sps_bdof_pic_present_flag )
    pic_disable_bdof_flag                                                 u(1)
if( sps_dmvr_pic_present_flag )
```

| Descriptor |
|---|
|    pic_disable_dmvr_flag     u(1) |
|  if( sps_prof_pic_present_flag ) |
|    pic_disable_prof_flag     u(1) |
|  if( sps_triangle_enabled_flag && MaxNumMergeCand >= 2 && |
|     !pps_max_num_merge_cand_minus_max_num_triangle_cand_plus1 ) |
|    pic_max_num_merge_cand_minus_max_num_triangle_cand     ue(v) |
|  if ( sps_ibc_enabled_flag ) |
|    pic_six_minus_max_num_ibc_merge_cand     ue(v) |
|  if( sps_joint_cbcr_enabled_flag ) |
|    pic_joint_cbcr_sign_flag     u(1) |
|  if( sps_sao_enabled_flag ) { |
|    pic_sao_enabled_present_flag     u(1) |
|    if( pic_sao_enabled_present_flag ) { |
|      pic_sao_luma_enabled_flag     u(1) |
|      if(ChromaArrayType != 0 ) |
|        pic_sao_chroma_enabled_flag     u(1) |
|    } |
|  } |
|  if( sps_alf_enabled_flag <u>&&!ph_predict_alf_params_flag</u> ) { |
|    pic_alf_enabled_present_flag     u(1) |
|    if( pic_alf_enabled_present_flag ) { |
|      pic_alf_enabled_flag     u() |
|      if( pic_alf_enabled_flag ) { |
|        pic_num_alf_aps_ids_luma     u(3) |
|        for( i = 0; i < pic_num_alf_aps_ids_luma; i++ ) |
|          pic_alf_aps_id_luma[ i ]     u(3) |
|        if( ChromaArrayType != 0 ) |
|          pic_alf_chroma_idc     u(2) |
|        if( pic_alf_chroma_idc ) |
|          pic_alf_aps_id_chroma     u(3) |
|      } |
|    } |
|  } |
|  if ( !pps_dep_quant_enabled_flag ) |
|    pic_dep_quant_enabled_flag     u(1) |
|  if( !pic_dep_quant_enabled_flag ) |
|    sign_data_hiding_enabled_flag     u(1) |
|  if( deblocking_filter_override_enabled_flag <u>&&</u> |
| <u>!ph_predict_deblocking_filter_override_params_flag</u>) { |
|    pic_deblocking_filter_override_present_flag     u(1) |
|    if( pic_deblocking_filter_override_present_flag ) { |
|      pic_deblocking_filter_override_flag     u(1) |
|      if( pic_deblocking_filter_override_flag ) { |
|        pic_deblocking_filter_disabled_flag     u(1) |
|        if( !pic_deblocking_filter_disabled_flag ) { |
|          pic_beta_offset_div2     se(v) |
|          pic_tc_offset_div2     se(v) |
|        } |
|      } |
|    } |
|  } |
|  if( sps_lmcs_enabled_flag ) { |
|    pic_lmcs_enabled_flag     u(1) |
|    if( pic_lmcs_enabled_flag ) { |
|      pic_lmcs_aps_id     u(2) |
|      if( ChromaArrayType != 0 ) |
|        pic_chroma_residual_scale_flag     u(1) |
|    } |
|  } |
|  if( sps_scaling_list_enabled_flag ) { |
|    pic_scaling_list_present_flag     u(1) |
|    if( pic_scaling_list_present_flag ) |
|      pic_scaling_list_aps_id     u(3) |
|  } |
|  if( picture_header_extension_present_flag ) { |
|    ph_extension_length     ue(v) |
|    for( i = 0; i < ph_extension_length; i++) |
|      ph_extension_data_byte[ i ]     u(8) |
|  } |
|  rbsp_trailing_bits( ) |
| } | picture_header_prediction_enabled_flag equal to 1 specifies that parameter values for the current picture header may be predicted from the picture header of the picture with index picture_header_prediction_rpl_idx in reference picture list picture_header_predicition_rpl. picture_header_prediction_enabled_flag equal to 0 specifies that the parameter values of the current picture header are not predicted from another picture header.

picture_header_prediction_rpl specifies the reference picture list used to determine the picture to predict picture header parameters from.

picture_header_prediction_rpl_idx specifies the index of the picture in the reference picture list i, from which picture header parameters are predicted.

ph_predict_loop_filter_across_virtual_boundaries_params_flag equal to 1 specifies that ph_loop_filter_across_virtual_boundaries_disabled_present_flag, ph_num_ver_virtual_boundaries, ph_virtual_boundaries_pos_x[i], ph_num_hor_virtual_boundaries and ph_virtual_boundaries_pos_y[i] are predicted from the picture header of the picture with index picture_header_prediction_rpl_idx in reference picture list picture_header_predicition_rpl. ph_predict_loop_filter_across_virtual_boundaries_params_flag equal to 0 specifies that these parameters are not predicted from another picture header. When not present, ph_predict_loop_filter_across_virtual_boundaries_params_flag is inferred to be 0.

ph_predict_partition_constraint_override_params_flag equal to 1 specifies that partition_constraints_override_flag, pic_log 2_diff min_qt_min_cb_intra_slice_luma, pic_log 2_diff_min_qt_min_cb_inter_slice, pic_max_mtt_hierarchy_depth_inter_slice, pic_max_mtt_hierarchy_depth_intra_slice_luma, pic_log 2_diff_max_bt_min_qt_intra_slice_luma, pic_log 2_diff max_tt_min_qt_intra_slice_luma, pic_log 2_diff_max_bt_min_qt_inter_slice, pic_log 2_diff_max_tt_min_qt_inter_slice, pic_log 2_diff min_qt_min_cb_intra_slice_chroma, pic_max_mtt_hierarchy_depth_intra_slice_chroma, pic_log 2_diff_max_bt_min_qt_intra_slice_chroma and pic_log 2_diff_max_tt_min_qt_intra_slice_chroma are predicted from the picture header of the picture with index picture_header_prediction_rpl_idx in reference picture list picture_header_predicition_rpl. ph_predict_partition_constraint_override_params_flag equal to 0 specifies that these parameters are not predicted from another picture header. When not present, ph_predict_partition_constraint_override_params flag is inferred to be 0.

ph_predict_cu_qp_delta_params_flag equal to 1 specifies that pic_cu_qp_delta_subdiv_intra_slice and pic cu_qp_delta_subdiv_inter_slice are predicted from the picture header of the picture with index picture_header_prediction_rpl_idx in reference picture list picture_header_predicition_rpl. ph_predict_cu_qp_delta_params_flag equal to 0 specifies that these parameters are not predicted from another picture header. When not present, ph_predict_cu_qp_delta_params_flag is inferred to be 0.

ph_predict_chroma_qp_offset_list_params_flag equal to 1 specifies that pic_cu_chroma_qp_offset_subdiv_intra_slice and pic_cu_chroma_qp_offset_subdiv_inter_slice are predicted from the picture header of the picture with index picture_header_prediction_rpl_idx in reference picture list picture_header_predicition_rpl. ph_predict_chroma_qp_offset_list_params flag equal to 0 specifies that these parameters are not predicted from another picture header. When not present, ph_predict_chromaqp_offset_list_params_flag is inferred to be 0.

ph_predict_alf_params_flag equal to 1 specifies that pic_alf_enabled_present_flag, pic_alf_enabled_flag, pic_num_alf_aps_ids_luma, pic_alf_aps_id_luma[i], pic_alf_chroma_idc and pic_alf_aps_id_chroma are predicted from the picture header of the picture with index picture_header_prediction_rpl_idx in reference picture list picture_header_predicition_rpl. ph_predict_alf_params_flag equal to 0 specifies that these parameters are not predicted from another picture header. When not present, ph_predict_alf_params_flag is inferred to be 0.

ph_predict_deblocking_filter_override_params_flag equal to 1 specifies that pic_deblocking_filter_override_present_flag, pic_deblocking_filter_override_flag, pic_deblocking_filter_disabled_flag, pic_beta_offset_div2 and pic_tc_offset_div2 are predicted from the picture header of the picture with index picture_header_prediction_rpl_idx in reference picture list picture_header_predicition_rpl. ph_predict_deblocking_filter_override_params_flag equal to 0 specifies that these parameters are not predicted from another picture header. When not present, ph_predict_deblocking_filter_override_params_flag is inferred to be 0.

Figure 6:
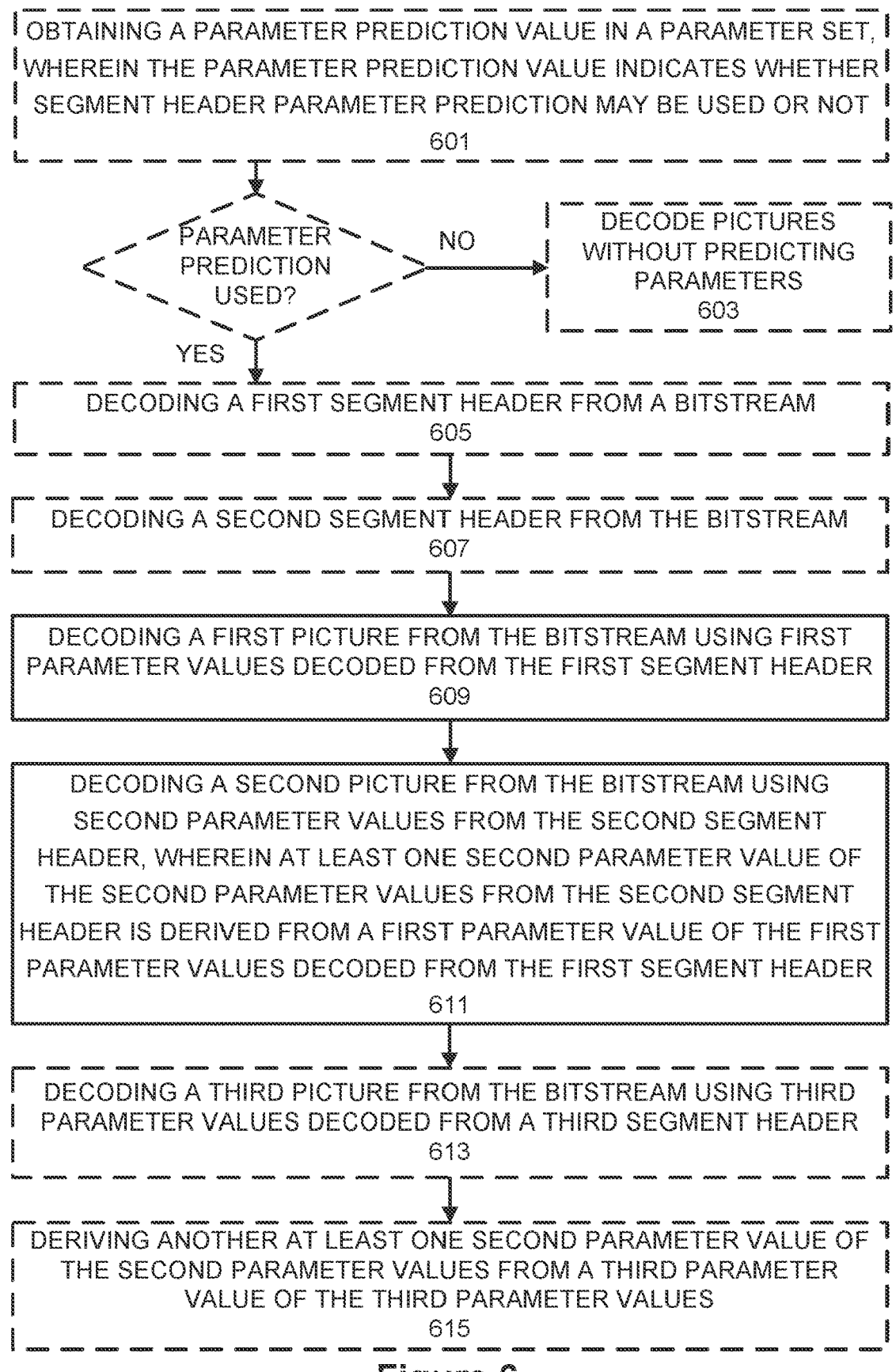

Now that the various embodiments of inventive concepts have been described, operations a decoder executes to perform the various embodiments of inventive concepts shall be described. Turning to FIG. 6, operations of the decoder 306 (implemented using the structure of the block diagram of FIG. 5) will now be discussed with reference to the flow chart of FIG. 6 according to some embodiments of inventive concepts. For example, modules may be stored in memory 503 of FIG. 5, and these modules may provide instructions so that when the instructions of a module are executed by respective wireless device processing circuitry 501, processing circuitry 501 performs respective operations of the flow chart.

In block 601, the processing circuitry 501 may obtain a parameter prediction value in a parameter set, wherein the parameter prediction value indicates whether segment header parameter prediction may be used or not. If segment header parameter prediction is not used, then the processing circuitry 501, the processing circuitry 501 may decode pictures without predicting any parameter values of parameters in block 603.

In block 605, the processing circuitry 501 may decode a first segment header from the bitstream. The first segment header has first parameter values that may be used to decode a first picture and that may also be used to derive (e.g., predict) parameters for other pictures. The first parameter values of the first segment header may be stored in a memory slot and the processor circuitry 501 may remove the first parameter values from memory when the picture associated with the first segment header is removed from memory. The first segment header may be a picture header.

In block 607, the processing circuitry 501 may decode a second segment header from the bitstream. The second segment header has second parameter values that may be used to decode a second picture. The second segment header may be a picture header.

The processing circuitry 501 may identify the first segment header and the second segment header from a segment header identifier. The processing circuitry 501 may decode the segment header identifier from the segment header. In one embodiment, the segment header identifier is a picture order count value.

In block 609, the processing circuitry 501 may decode a first picture from the bitstream using the first parameter values decoded from the first segment header. In one embodiment, decoding the first picture includes decoding a closest preceding picture in decoding order related to a second picture. In another embodiment, decoding the first picture includes decoding a closest preceding picture in decoding order related to the second picture, for which a picture type of the first picture is a same picture type as for the second picture. In a further embodiment, decoding the first picture includes decoding a closest preceding picture in decoding order related to the second picture, for which a temporal sublayer identifier and/or layer identifier of the first picture is a same temporal sublayer identifier and/or layer identifier as for the second picture.

In block 611, the processing circuitry 501 may decode a second picture from the bitstream using second parameter values from the second segment header, wherein at least one second parameter value of the second parameter values from the second segment header is derived from a first parameter value of the first parameter values in the first segment header.

The processing circuitry 501 may identify the first segment header by decoding a value from the second segment header that identifies the first segment header to use to derive the at least one second parameter value. The first picture for the first segment header may be identified as a picture in a reference picture list of the second picture.

In one embodiment, the at least one second parameter value is one or more of: a gradual decoding refresh, GDR, parameter; a picture order count, POC, parameter; a subpicture parameter; a loop-filter across virtual boundaries parameter; a reference picture list, RPL, parameter; a partition constraint override parameter; a quantization parameter, QP, parameter; a sample adaptive offset, SAO, parameter; an adaptive loop filter, ALF parameter; a deblocking filter parameter; a luma mapping and chroma scaling, LMCS, parameter; or a scaling list parameter.

In block 613, the processing circuitry 501 may decode a third picture using third parameter values from a third segment header from the bitstream before decoding the second picture.

In an embodiment, decoding the second picture using second parameter values from the second segment header comprises deriving the at least one second parameter value of the second parameter values from the second segment header from the first parameter value of the first parameter values in the first segment header and from a third parameter value of the third parameter values in the third segment header.

In another embodiment, deriving the at least one second parameter may be performed by at least one of copying a first parameter value of the first parameter values to be the at least one second parameter and deriving the at least one second parameter value using delta prediction from the first parameter value.

In a further embodiment, the at least one second parameter from the first parameter value of the first parameter values in the first segment header may be derived by the processing circuitry 501 by predicting the at least one second parameter from the first parameter value of the first parameter values in the first segment header.

In another embodiment, the processing circuitry 501 may overwrite a first parameter value of the first parameter values with a second parameter value of the second parameter values.

In block 615, the processing circuitry 501 may derive another at least one second parameter value of the second parameter values from the second segment header from a third parameter value of the third parameter values in the third segment header.

The first segment header, the second segment header, and the third segment header may be a picture header.

A segment may be a picture, a frame, a field, or an image.

Turning to FIG. 7, in one embodiment, the first segment header is a first picture header, the second segment header is a second picture header, and the first picture and the second picture each comprise slices that each comprises a slice header. The processing circuitry 501 may decode the second picture from the bitstream using second parameter values from the second picture header by decoding, in block 701, a first slice of the second picture from the bitstream, wherein the first slice comprises a first slice header and decoding the first slice comprises using at least one value decoded from the first slice header and the at least one second parameter value, and decoding, in block 703, a second slice of the second picture from the bitstream, wherein the second slice comprises a second slice header and decoding the second slice comprises using at least one value decoded from the second slice header and the at least one second parameter value.

Various operations from the flow chart of FIG. 6 may be optional with respect to some embodiments of decoders and related methods. Regarding methods of example embodiment 1 (set forth below), for example, operations of blocks 601, 603, 605, 607, 613, and 615 of FIG. 6 may be optional.

Operations of an encoder 300 (implemented using the structure of FIG. 4) will now be discussed with reference to the flow chart of FIG. 8 according to some embodiments of inventive concepts. For example, modules may be stored in memory 403 of FIG. 4, and these modules may provide instructions so that when the instructions of a module are executed by respective encoder processing circuitry 401, processing circuitry 401 performs respective operations of the flow chart.

In block 801, the processing circuitry 401 may signal a parameter prediction value in a parameter set, wherein the parameter prediction value indicates whether segment header parameter prediction may be used or not.

In block 803, the processing circuitry 401 may determine first parameter values for the first segment header of a first picture. The first parameter values may be used to encode (and decode) a first picture and that may also be used to derive (e.g., predict) parameters for other pictures. In block 805, the processing circuitry 401 may encode the first segment header to the bitstream. In one embodiment, the first segment header is identified as a picture in a reference picture list of a second picture.

In block 807, the processing circuitry 401 may encode a second segment header of a second picture into the bitstream.

In block 809, the processing circuitry 401 may encode a first picture into the bitstream using first parameter values from the first segment header. In one embodiment, the first picture may be encoded by encoding a closest preceding picture related to a second picture. In another embodiment, the first picture may be encoded by encoding a closest preceding picture related to the second picture, for which a picture type of the first picture is a same picture type as the second picture. In a further embodiment, the first picture may be encoded by encoding a closest preceding picture related to the second picture, for which a temporal sublayer identifier and/or layer identifier is a same temporal sublayer identifier and/or layer identifier as for the second picture.

In block 811, the processing circuitry 401 may encode a second picture into the bitstream using second parameter values from the second segment header, wherein at least one second parameter value of the second parameter values from the second segment header is a derived parameter value. In one embodiment, the processing circuitry 401 may encode a value into the second segment header that identifies the first segment header to use for a decoder to derive the at least one parameter. In an embodiment, the identifier value is a picture order count value.

In an embodiment, the at least one second parameter value is one or more of: a gradual decoding refresh, GDR, parameter; a picture order count, POC, parameter; a subpicture parameter; a loop-filter across virtual boundaries parameter; a reference picture list, RPL, parameter; a partition constraint override parameter; a quantization parameter, QP, parameter; a sample adaptive offset, SAO, parameter; an adaptive loop filter, ALF parameter; a deblocking filter parameter; a luma mapping and chroma scaling, LMCS, parameter; or a scaling list parameter.

In one embodiment, the first segment header is a first picture header, the second segment header is a second picture header, and the first picture and the second picture each comprise slices that each comprises a slice header. Turning briefly to FIG. 9, in this embodiment, encoding the second picture into the bitstream using second parameter values from the second picture header includes encoding, in block 901, a first slice of the second picture into the bitstream, wherein the first slice comprises a first slice header and encoding the first slice comprises using at least one value from the first slice header and the at least one second parameter value and encoding, in block 903, a second slice of the second picture into the bitstream, wherein the second slice comprises a second slice header and encoding the second slice comprises using at least one value encoded from the second slice header and the at least one second parameter value.

In block 813, the processing circuitry 401 may determine third parameter values for a third segment header. In block 815, the processing circuitry 401 may encode the third segment header to the bitstream.

In one embodiment, the at least one second parameter value of the second parameter values from the second segment header is derived from the first parameter values in the first segment header and at least one other second parameter value of the second parameter values from the second segment header is derived from the third parameter values in the third segment header.

In another embodiment, the at least one second parameter value of the second parameter values from the second segment header is derived from one of the first parameter values in the first segment header and/or from one of the third parameter values in the third segment header.

In any of the above blocks, the segment header (e.g., the first segment header, the second segment header, or the third segment header) may be a picture header. A segment is a picture, a frame, a field or an image.

Figure 8:
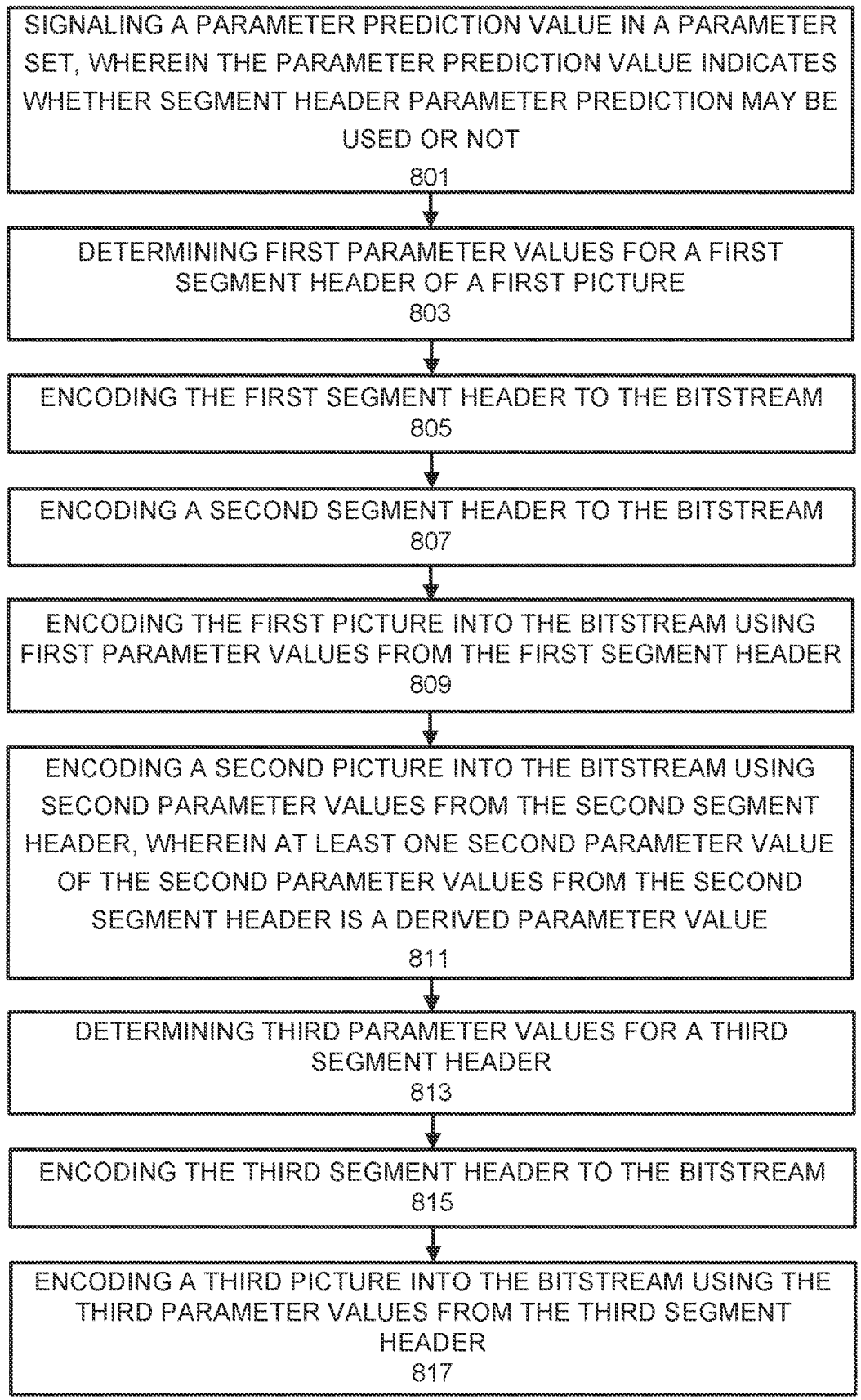

Various operations from the flow chart of FIG. 8 may be optional with respect to some embodiments of RAN nodes and related methods. Regarding methods of example embodiment 29 (set forth below), for example, operations of blocks 801, 803, 805, 807, 813, and 815 of FIG. 8 may be optional.

Example Embodiments are Discussed Below

Embodiment 1. A method for decoding a plurality of pictures from a bitstream, the bitstream comprising a first segment header and a second segment header, the method comprising:
  decoding (609) a first picture from the bitstream using first parameter values decoded from the first segment header; and
  decoding (611) a second picture from the bitstream using second parameter values from the second segment header, wherein at least one second parameter value of the second parameter values from the second segment header is derived from a first parameter value of the first parameter values decoded from the first segment header.

Embodiment 2. The method of Embodiment 1, further comprising:
  decoding (613) a third picture from the bitstream using third parameter values decoded from a third segment header from the bitstream before decoding the second picture.

Embodiment 3. The method of Embodiment 2 wherein decoding the second picture using second parameter values from the second segment header comprises deriving (615) another at least one second parameter value of the second parameter values from the second segment header from a third parameter value of the third parameter values in the third segment header.

Embodiment 4. The method of Embodiment 2 wherein decoding the second picture using second parameter values from the second segment header comprises deriving the at least one second parameter value of the second parameter values from the second segment header from the first parameter value of the first parameter values in the first segment header and from a third parameter value of the third parameter values in the third segment header.

Embodiment 5. The method of any of Embodiments 1-4 further comprising deriving the at least one second parameter value by at least one of copying a first parameter value of the first parameter values to be the at least one second parameter value and deriving the at least one second parameter value using delta prediction from the first parameter value.

Embodiment 6. The method of any of Embodiments 1-5 wherein decoding the first picture comprises decoding a closest preceding picture in decoding order related to the second picture.

Embodiment 7. The method of any of Embodiments 1-5 wherein decoding the first picture comprises decoding a closest preceding picture in decoding order related to the second picture, for which a picture type of the first picture is a same picture type as for the second picture.

Embodiment 8. The method of any of Embodiments 1-5 wherein decoding the first picture comprises decoding a closest preceding picture in decoding order related to the second picture, for which a temporal sublayer identifier and/or layer identifier of the first picture is a same temporal sublayer identifier and/or layer identifier as for the second picture.

Embodiment 9. The method of any of Embodiments 1-8 further comprising identifying the first segment header from a segment header identifier.

Embodiment 10. The method of Embodiment 9 wherein the segment header identifier is a picture order count value.

Embodiment 11. The method of any of Embodiments 9-10 further comprising decoding the segment header identifier from the first segment header.

Embodiment 12. The method of any of Embodiments 9-11 further comprising decoding a value from the second segment header that identifies the first segment header to use to derive the at least one parameter.

Embodiment 13. The method of any of Embodiments 1-12 where the first picture for the first segment header is identified as a picture in a reference picture list of the second picture.

Embodiment 14. The method of any of Embodiments 1-13 wherein first parameter values of the first segment header are stored in a memory slot, the method further comprising removing the first parameter values from memory when the picture associated with the first segment header is removed from memory.

Embodiment 15. The method of any of Embodiments 1-14 further comprising obtaining (601) a parameter prediction value from a parameter set, wherein the parameter prediction value indicates whether segment header parameter prediction may be used or not.

Embodiment 16. The method of any of Embodiments 1-15 wherein the at least one second parameter value is one or more of: a gradual decoding refresh, GDR, parameter; a picture order count, POC, parameter; a subpicture parameter; a loop-filter across virtual boundaries parameter; a reference picture list, RPL, parameter; a partition constraint override parameter; a quantization parameter, QP, parameter; a sample adaptive offset, SAO, parameter; an adaptive loop filter, ALF parameter; a deblocking filter parameter; a luma mapping and chroma scaling, LMCS, parameter; or a scaling list parameter.

Embodiment 17. The method of any of Embodiments 1-16 where the first segment header is a picture header.

Embodiment 18. The method of any of Embodiments 1-17 wherein the second segment header is a picture header.

Embodiment 19. The method of any of Embodiments 2-18 where the third segment header is a picture header.

Embodiment 20. The method of any of Embodiments 1-19 further comprising deriving the at least one second parameter from the first parameter value of the first parameter values in the first segment header by predicting the at least one second parameter from the first parameter value of the first parameter values in the first segment header.

Embodiment 21. The method of any of Embodiments 1-20 where a segment is a picture, a frame, a field or an image.

Embodiment 22. The method of any of Embodiments 1-21 wherein the first segment header is a first picture header, the second segment header is a second picture header, and the first picture and the second picture each comprise slices that each comprises a slice header, the method further comprising:
    decoding (605) the first picture header from the bitstream;
    decoding (607) the second picture header from the bitstream; and
    wherein decoding the second picture from the bitstream using second parameter values from the second picture header comprises:
    decoding (701) a first slice of the second picture from the bitstream, wherein the first slice comprises a first slice header and decoding the first slice comprises using at least one value decoded from the first slice header and the at least one second parameter value;
    decoding (703) a second slice of the second picture from the bitstream, wherein the second slice comprises a second slice header and decoding the second slice comprises using at least one value decoded from the second slice header and the at least one second parameter value.

Embodiment 23. The method of any of Embodiments 1-22 further comprising overwriting another first parameter value of the first parameter values with another second parameter value of the second parameter values.

Embodiment 24. A decoder (306) for a communication network, the decoder (306) comprising:
    a processor (501); and
    memory (503) coupled with the processor, wherein the memory comprises instructions that when executed by the processor cause the processor to perform operations comprising:
        decoding (609) a first picture from a bitstream using first parameter values decoded from a first segment header; and
        decoding (611) a second picture from the bitstream using second parameter values from a second segment header, wherein at least one second parameter value of the second parameter values from the second segment header is derived from a first parameter value of the first parameter values decoded from the first segment header.

Embodiment 25. The decoder of Embodiment 24, wherein the memory (503) comprises further instructions that when executed by the processor (501) cause the processor (501) to perform operations according to any of Embodiments 2-23.

Embodiment 26. A computer program product comprising computer-executable instructions configured to, when the computer-executable instructions are executed on a processor (501) comprised in a device (306), cause the device (306) to perform operations comprising:
    decoding (609) a first picture from a bitstream using first parameter values decoded from a first segment header; and
    decoding (611) a second picture from the bitstream using second parameter values from a second segment header, wherein at least one second parameter value of the second parameter values from the second segment header is derived from a first parameter value of the first parameter values decoded from the first segment header.

Embodiment 27. The computer program product of Embodiment 26 comprising further computer-executable instructions configured to, when the computer-executable instructions are executed on a processor comprised in the device (306), cause the device (306) to perform the method according to any one of Embodiments 2-23.

Embodiment 28. A computer program product comprising a computer-readable storage medium, the computer-readable storage medium having computer-executable instructions configured to, when the computer-executable instructions are executed on a processor comprised in a device (306), cause the device (306) to perform operations comprising:
    decoding (609) a first picture from a bitstream using first parameter values decoded from a first segment header; and
    decoding (611) a second picture from the bitstream using second parameter values from a second segment header, wherein at least one second parameter value of the second parameter values from the second segment header is derived from a first parameter value of the first parameter values decoded from the first segment header.

Embodiment 29. The computer program product of Embodiment 28 having further computer-executable instructions configured to, when the further computer-executable instructions are executed on a processor (501) comprised in the device (306), cause the device (306) to perform the method according to any one of Embodiments 2-23.

Embodiment 30. A method for encoding a plurality of pictures into a bitstream, the bitstream comprising a first segment header and a second segment header, the method comprising:
    encoding (809) a first picture into the bitstream using first parameter values from the first segment header; and
    encoding (811) a second picture into the bitstream using second parameter values from the second segment header, wherein at least one second parameter value of the second parameter values from the second segment header is a derived parameter value.

Embodiment 31. The method of Embodiment 30, further comprising:
encoding (817) a third picture using third parameter values from a third segment header.

Embodiment 32. The method of Embodiment 31 further comprising:
determining (803) the first parameter values for the first segment header of a first picture;
encoding (805) the first segment header to the bitstream;
determining (813) the third parameter values for the third segment header; and
encoding (815) the third segment header to the bitstream;
wherein the at least one second parameter value of the second parameter values from the second segment header is derived from the first parameter values in the first segment header and at least one other second parameter value of the second parameter values from the second segment header is derived from the third parameter values in the third segment header.

Embodiment 33. The method of Embodiment 31 further comprising:
determining (803) the first parameter values for the first segment header of a first picture;
encoding (805) the first segment header to the bitstream;
determining (813) the third parameter values for the third segment header; and
encoding (815) the third segment header to the bitstream;
wherein the at least one second parameter value of the second parameter values from the second segment header is derived from one of the first parameter values in the first segment header and/or from one of the third parameter values in the third segment header.

Embodiment 34. The method of any of Embodiments 30-33 wherein encoding the first picture comprises encoding a closest preceding picture related to the second picture.

Embodiment 35. The method of any of Embodiments 30-33 wherein encoding the first picture comprises encoding a closest preceding picture related to the second picture, for which a picture type of the first picture is a same picture type as a picture type of the second picture.

Embodiment 36. The method of any of Embodiments 30-33 wherein encoding the first picture comprises encoding a closest preceding picture related to the second picture, for which a temporal sublayer identifier and/or layer identifier is a same temporal sublayer identifier and/or layer identifier as for the second picture.

Embodiment 37. The method of any of Embodiments 30-36 further comprising encoding a value into the second segment header that identifies the first segment header to use for a decoder to derive the at least one parameter.

Embodiment 38. The method of Embodiment 37 wherein the identifier value is a picture order count value.

Embodiment 39. The method of any of Embodiments 30-38 where the first segment header is identified as a picture in a reference picture list of the second picture.

Embodiment 40. The method of any of Embodiments 30-39 further comprising signaling a parameter prediction value in a parameter set, wherein the parameter prediction value indicates whether segment header parameter prediction may be used or not.

Embodiment 41. The method of any of Embodiments 30-40 wherein the at least one second parameter value is one or more of: a gradual decoding refresh, GDR, parameter; a picture order count, POC, parameter; a subpicture parameter; a loop-filter across virtual boundaries parameter; a reference picture list, RPL, parameter; a partition constraint override parameter; a quantization parameter, QP, parameter; a sample adaptive offset, SAO, parameter; an adaptive loop filter, ALF parameter; a deblocking filter parameter; a luma mapping and chroma scaling, LMCS, parameter; or a scaling list parameter.

Embodiment 42. The method of any of Embodiments 30-41 where a segment header is a picture header.

Embodiment 43. The method of Embodiment 42, wherein the first segment header is a first picture header, the second segment header is a second picture header, and the first picture and the second picture each comprise slices that each comprises a slice header, the method further comprising:
encoding (805) the first picture header into the bitstream;
encoding (807) the second picture header into the bitstream; and
wherein encoding the second picture into the bitstream using second parameter values from the second picture header comprises:
encoding (901) a first slice of the second picture into the bitstream, wherein the first slice comprises a first slice header and encoding the first slice comprises using at least one value from the first slice header and the at least one second parameter value; and
encoding (903) a second slice of the second picture into the bitstream, wherein the second slice comprises a second slice header and encoding the second slice comprises using at least one value encoded from the second slice header and the at least one second parameter value.

Embodiment 44. The method of any of Embodiments 30-43 where a segment is a picture, a frame, a field or an image.

Embodiment 45. An encoder for a communication network, the encoder comprising:
a processor (401); and
memory (403) coupled with the processor, wherein the memory comprises instructions that when executed by the processor cause the processor to perform operations comprising:
encoding a first picture into a bitstream using first parameter values from a first segment header; and
encoding a second picture into the bitstream using second parameter values from a second segment header, wherein at least one second parameter value of the second parameter values from the second segment header is a derived parameter value.

Embodiment 46. The encoder of Embodiment 45, wherein the memory comprises further instructions that when executed by the processor cause the processor to perform operations according to any of Embodiments 30-44.

Embodiment 47. A computer program product comprising computer-executable instructions configured to, when the computer-executable instructions are executed on a processor comprised in a device (300), cause the device (300) to perform operations comprising:
encoding (809) a first picture to a bitstream using first parameter values from a first segment header; and
encoding (811) a second picture to the bitstream using second parameter values from a second segment header, wherein at least one second parameter value of the second parameter values from the second segment header is a predicted parameter value.

Embodiment 48. The computer program product of Embodiment 47 comprising further computer-executable instructions configured to, when the computer-executable instructions are executed on a processor comprised in the device, cause a device to perform the method according to any one of Embodiments 30-44.

Embodiment 49. A computer program product comprising a computer-readable storage medium, the computer-readable storage medium having computer-executable instructions configured to, when the computer-executable instructions are executed on a processor comprised in a device (300), cause the device (300) to perform operations comprising:

encoding (809) a first picture into a bitstream using first parameter values from a first segment header;

encoding (811) a second picture into the bitstream using second parameter values from a second segment header, wherein at least one second parameter value of the second parameter values from the second segment header is a predicted parameter value.

Embodiment 50. The computer program product of Embodiment 49 having further computer-executable instructions configured to, when the further computer-executable instructions are executed on a processor comprised in the device, cause a device to perform the method according to any one of Embodiments 30-44.

Explanations are provided below for various abbreviations/acronyms used in the present disclosure.

| Abbreviation | Explanation |
|---|---|
| AU | Access Unit |
| AUD | Access Unit Delimiter |
| ALF | Adaptive Loop Filter |
| APS | Adaptive Parameter Set |
| BLA | Broken Link Access |
| CLVS | Coded Layer Video Sequence |
| CRA | Clean Random Access |
| CVS | Coded Video Stream |
| CVSS | CVS Start |
| CU | Coding Unit |
| DPS | Decoding Parameter Set |
| DRAP | Dependent Random Access Point |
| GDR | Gradual Decoding Refresh |
| HEVC | High-Efficiency Video Coding |
| IDR | Instantaneous Decoding Refresh |
| IRAP | Intra Random Access Point |
| LMCS | Luma Mapping and Chroma Scaling |
| MPEG | Motion Picture Experts Group |
| NAL | Network Abstraction Layer |
| NALU | NAL unit |
| NUT | NAL unit type |
| PPS | Picture Parameter Set |
| RADL | Random Access Decodable Leading |
| RAP | Random Access Point |
| RASL | Random Access Skipped Leading |
| RBSP | Raw Byte Sequence Payload |
| RPL | Reference Picture List |
| SEI | Supplemental Enhancement layer |
| SPS | Sequence Parameter Set |
| STSA | Step-wise Temporal Layer Access |
| VCL | Video Coding Layer |
| VPS | Video Parameter Set |
| VVC | Versatile Video Coding |
| SEI | Supplemental Enhancement layer |
| SPS | Sequence Parameter Set |
| STSA | Step-wise Temporal Layer Access |
| VCL | Video Coding Layer |
| VPS | Video Parameter Set |
| VVC | Versatile Video Coding |

References are identified below.

JVET-P2001-vE Versatile Video Coding (Draft 7), B. Bross, J. Chen, S. Liu, Y.-K. Wang, 2019-11-14

Additional Explanation is Provided Below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 10:
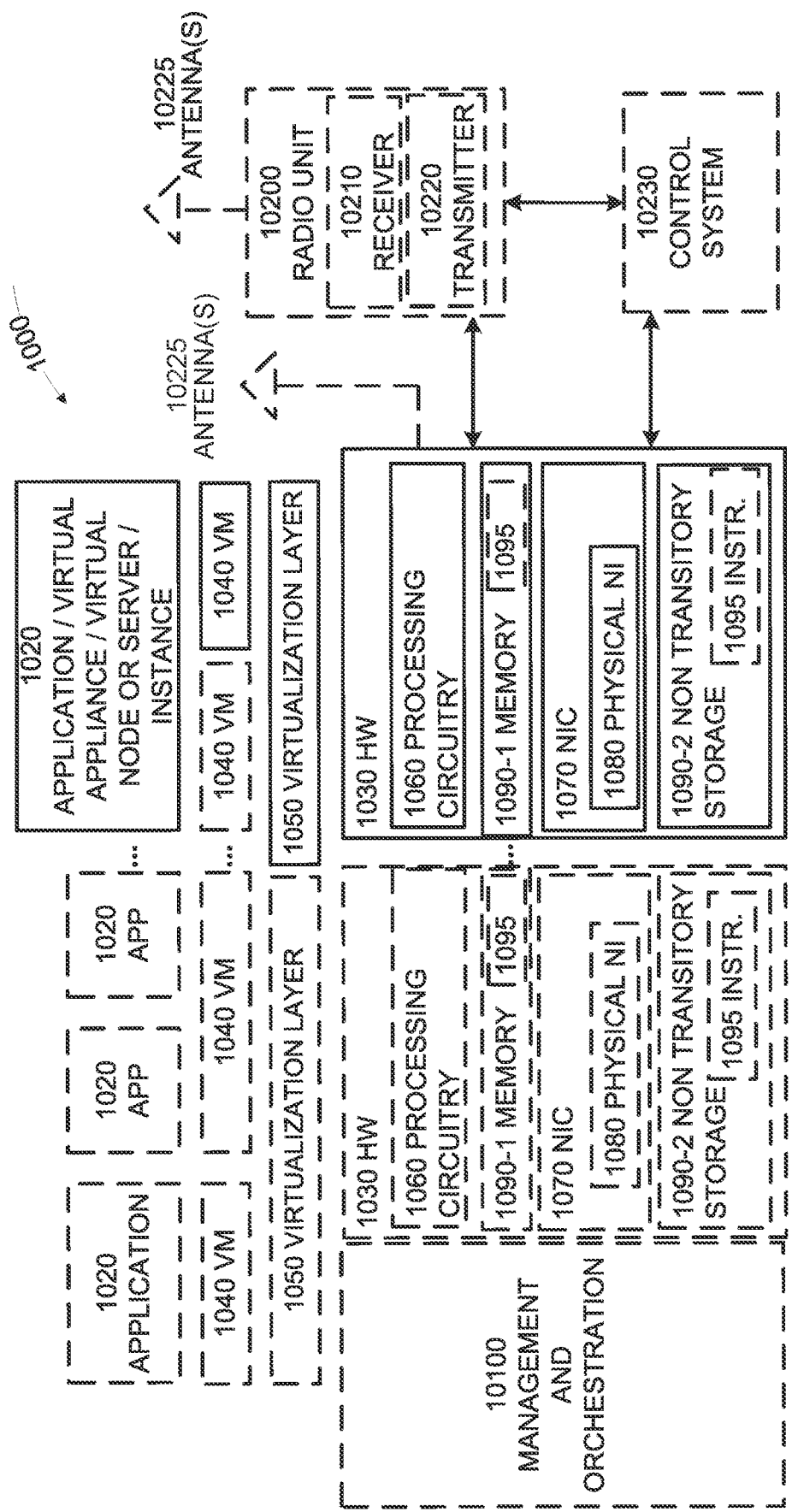
FIG. 10 is a block diagram of a virtualization environment in accordance with some embodiments.

FIG. 10 illustrates a virtualization environment in accordance with some embodiments.

FIG. 10 is a schematic block diagram illustrating a virtualization environment 1000 in which functions implemented by some embodiments of decoders and/or encoders may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000, comprises general-purpose or special-purpose network hardware devices 1030 comprising a set of one or more processors or processing circuitry 1060, which may be commercial off-the-shelf (COTS) processors, dedicated Application Specific Integrated Circuits (ASICs), or any other type of processing circuitry including digital or analog hardware components or special purpose processors. Each hardware device may comprise memory 1090-1 which may be non-persistent memory for temporarily storing instructions 1095 or software executed by processing circuitry 1060. Each hardware device may comprise one or more network interface controllers (NICs) 1070, also known as network interface cards, which include physical network interface 1080. Each hardware device may also include non-transitory, persistent, machine-readable storage media 1090-2 having stored therein software 1095 and/or instructions executable by processing circuitry 1060. Software 1095 may include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040 comprise virtual processing, virtual memory, virtual networking or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a virtual machine monitor (VMM). Virtualization layer 1050 may present a virtual operating platform that appears like networking hardware to virtual machine 1040.

As shown in FIG. 10, hardware 1030 may be a standalone network node with generic or specific components. Hardware 1030 may comprise antenna 10225 and may implement some functions via virtualization. Alternatively, hardware 1030 may be part of a larger cluster of hardware (e.g. such as in a data center or customer premise equipment (CPE)) where many hardware nodes work together and are managed via management and orchestration (MANO) 10100, which, among others, oversees lifecycle management of applications 1020.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1040 may be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 10200 that each include one or more transmitters 10220 and one or more receivers 10210 may be coupled to one or more antennas 10225. Radio units 10200 may communicate directly with hardware nodes 1030 via one or more appropriate network interfaces and may be used in combination with the virtual components to provide a virtual node with radio capabilities, such as a radio access node or a base station.

In some embodiments, some signalling can be effected with the use of control system 10230 which may alternatively be used for communication between the hardware nodes 1030 and radio units 10200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method for decoding a plurality of pictures from a bitstream, each picture comprising multiple slices, the bitstream comprising a first picture header and a second picture header, the method comprising;
   decoding a first picture from the bitstream using first parameter values decoded from the first picture header; and
   decoding a second picture from the bitstream using second parameter values from the second picture header, wherein at least one second parameter value of the second parameter values from the second picture header is derived from a first parameter value of the first parameter values decoded from the first picture header, wherein a value from the second picture header identifies the first picture header to use to derive the at least one second parameter value.

2. The method of claim 1, further comprising:
   decoding a third picture from the bitstream using third parameter values decoded from a third picture header from the bitstream before decoding the second picture, wherein decoding the second picture using second parameter values from the second picture header comprises at least one of:
   deriving another at least one second parameter value of the second parameter values from the second picture header from a third parameter value of the third parameter values in the third picture header; and
   deriving the at least one second parameter value of the second parameter values from the second picture header from the first parameter value of the first parameter values in the first picture header and from a third parameter value of the third parameter values in the third picture header.

3. The method of claim 1 further comprising deriving the at least one second parameter value by at least one of copying a first parameter value of the first parameter values to be the at least one second parameter value and deriving the at least one second parameter value using delta prediction from the first parameter value.

4. The method of claim 1 wherein decoding the first picture comprises at least one of:
   decoding a closest preceding picture in decoding order related to the second picture;
   decoding a closest preceding picture in decoding order related to the second picture, for which a picture type of the first picture is a same picture type as for the second picture; and
   decoding a closest preceding picture in decoding order related to the second picture, for which a temporal sublayer identifier and/or layer identifier of the first picture is a same temporal sublayer identifier and/or layer identifier as for the second picture.

5. The method of claim 1 further comprising identifying the first picture header from a picture header identifier by at least one of:
   identifying the first picture header from a picture order count value; and
   decoding the picture header identifier from the first picture header.

6. The method of claim 1 further comprising obtaining a parameter prediction value from a parameter set, wherein the parameter prediction value indicates whether picture header parameter prediction may be used or not.

7. The method of claim 1 wherein the at least one second parameter value is one or more of: a gradual decoding refresh, GDR, parameter; a picture order count, POC, parameter; a subpicture parameter; a loop-filter across virtual boundaries parameter; a reference picture list, RPL, parameter; a partition constraint override parameter; a quantization parameter, QP, parameter; a sample adaptive offset, SAO, parameter; an adaptive loop filter, ALF parameter; a deblocking filter parameter; a luma mapping and chroma scaling, LMCS, parameter; or a scaling list parameter.

8. The method of claim 1 further comprising deriving the at least one second parameter from the first parameter value of the first parameter values in the first picture header by predicting the at least one second parameter from the first parameter value of the first parameter values in the first picture header.

9. The method of claim 1 wherein the first picture and the second picture each comprise slices that each comprises a slice header, the method further comprising:
   decoding the first picture header from the bitstream;
   decoding the second picture header from the bitstream; and
   wherein decoding the second picture from the bitstream using second parameter values from the second picture header comprises:
   decoding a first slice of the second picture from the bitstream, wherein the first slice comprises a first slice header and decoding the first slice comprises using at least one value decoded from the first slice header and the at least one second parameter value; and
   decoding a second slice of the second picture from the bitstream, wherein the second slice comprises a second slice header and decoding the second slice comprises using at least one value decoded from the second slice header and the at least one second parameter value.

10. A decoder for decoding encoded pictures, the encoded pictures each comprising multiple slices, the decoder comprising:
   a processor; and
   memory coupled with the processor, wherein the memory comprises instructions that when executed by the processor cause the processor to perform operations comprising:
   decoding a first picture from a bitstream using first parameter values decoded from a first picture header; and
   decoding a second picture from the bitstream using second parameter values from a second picture header, wherein at least one second parameter value of the second parameter values from the second picture header is derived from a first parameter value of the first parameter values decoded from the first picture header, wherein a value from the second picture header identifies the first picture header to use to derive the at least one second parameter value.

11. The decoder of claim 10, wherein the memory comprises further instructions that when executed by the processor cause the processor to perform further operations comprising:
   decoding a third picture from the bitstream using third parameter values decoded from a third picture header from the bitstream before decoding the second picture, wherein decoding the second picture using second parameter values from the second picture header comprises at least one of:
   deriving another at least one second parameter value of the second parameter values from the second picture header from a third parameter value of the third parameter values in the third picture header; and
   deriving the at least one second parameter value of the second parameter values from the second picture header from the first parameter value of the first parameter values in the first picture header and from a third parameter value of the third parameter values in the third picture header.

12. The decoder of claim 10 wherein in decoding the first picture, the memory comprises instructions that when executed by the processor cause the processor to perform operations comprising at least one of:
   decoding a closest preceding picture in decoding order related to the second picture;
   decoding a closest preceding picture in decoding order related to the second picture, for which a picture type of the first picture is a same picture type as for the second picture; and
   decoding a closest preceding picture in decoding order related to the second picture, for which a temporal sublayer identifier and/or layer identifier of the first picture is a same temporal sublayer identifier and/or layer identifier as for the second picture.

13. The decoder of claim 10, wherein the memory comprises further instructions that when executed by the processor cause the processor to perform operations further comprising identifying the first picture header from a picture header identifier by at least one of:
   identifying the first picture header from a picture order count value; and
   decoding the picture header identifier from the first picture header.

14. The decoder of claim 10, wherein the at least one second parameter value is one or more of: a gradual decoding refresh, GDR, parameter; a picture order count, POC, parameter; a subpicture parameter; a loop-filter across virtual boundaries parameter;
   a reference picture list, RPL, parameter; a partition constraint override parameter; a quantization parameter, QP, parameter; a sample adaptive offset, SAO, parameter; an adaptive loop filter, ALF parameter; a deblocking filter parameter; a luma mapping and chroma scaling, LMCS, parameter; or a scaling list parameter.

15. The decoder of claim 10, wherein the first picture and the second picture each comprise slices that each comprises a slice header, and wherein the memory comprises instructions that when executed by the processor cause the processor to perform operations further comprising:
decoding the first picture header from the bitstream;
decoding the second picture header from the bitstream; and
wherein decoding the second picture from the bitstream using second parameter values from the second picture header comprises:
decoding a first slice of the second picture from the bitstream, wherein the first slice comprises a first slice header and decoding the first slice comprises using at least one value decoded from the first slice header and the at least one second parameter value; and
decoding a second slice of the second picture from the bitstream, wherein the second slice comprises a second slice header and decoding the second slice comprises using at least one value decoded from the second slice header and the at least one second parameter value.

16. A method for encoding a plurality of pictures into a bitstream, the bitstream comprising a first picture header and a second picture header, the method comprising:
encoding a first picture into the bitstream using first parameter values from the first picture header; and
encoding a second picture into the bitstream using second parameter values from the second picture header, wherein at least one second parameter value of the second parameter values from the second picture header is a derived parameter value, wherein the second picture header comprises a value that identifies the first picture header to use to derive the parameter value.

17. The method of claim 16, wherein encoding the first picture comprises at least one of:
encoding a closest preceding picture related to the second picture;
encoding a closest preceding picture related to the second picture, for which a picture type of the first picture is a same picture type as a picture type of the second picture; and
encoding a closest preceding picture related to the second picture, for which a temporal sublayer identifier and/or layer identifier is a same temporal sublayer identifier and/or layer identifier as for the second picture.

18. The method of claim 16 wherein the at least one second parameter value is one or more of: a gradual decoding refresh, GDR, parameter; a picture order count, POC, parameter; a subpicture parameter; a loop-filter across virtual boundaries parameter;
a reference picture list, RPL, parameter; a partition constraint override parameter; a quantization parameter, QP, parameter; a sample adaptive offset, SAO, parameter; an adaptive loop filter, ALF parameter; a deblocking filter parameter; a luma mapping and chroma scaling, LMCS, parameter; or a scaling list parameter.

19. An encoder for encoding a plurality of pictures into a bitstream, the encoder comprising:
a processor; and
memory coupled with the processor, wherein the memory comprises instructions that when executed by the processor cause the processor to perform operations comprising:
encoding a first picture into a bitstream using first parameter values from a first picture header; and
encoding a second picture into the bitstream using second parameter values from a second picture header, wherein at least one second parameter value of the second parameter values from the second picture header is a derived parameter value, wherein the second picture header comprises a value that identifies the first picture header to use to derive the parameter value.

20. The encoder of claim 19, wherein in encoding the first picture, the memory comprises instructions that when executed by the processor cause the processor to perform operations comprising at least one of:
encoding a closest preceding picture related to the second picture;
encoding a closest preceding picture related to the second picture, for which a picture type of the first picture is a same picture type as a picture type of the second picture; and
encoding a closest preceding picture related to the second picture, for which a temporal sublayer identifier and/or layer identifier is a same temporal sublayer identifier and/or layer identifier as for the second picture.

21. The encoder of claim 19 wherein the at least one second parameter value is one or more of: a gradual decoding refresh, GDR, parameter; a picture order count, POC, parameter; a subpicture parameter; a loop-filter across virtual boundaries parameter;
a reference picture list, RPL, parameter; a partition constraint override parameter; a quantization parameter, QP, parameter; a sample adaptive offset, SAO, parameter; an adaptive loop filter, ALF parameter; a deblocking filter parameter; a luma mapping and chroma scaling, LMCS, parameter; or a scaling list parameter.

* * * * *